(12) United States Patent
Shibata

(10) Patent No.: US 7,315,888 B2
(45) Date of Patent: Jan. 1, 2008

(54) NETWORK MANAGEMENT SYSTEM

(75) Inventor: Atsushi Shibata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 630 days.

(21) Appl. No.: 10/022,838

(22) Filed: Dec. 20, 2001

(65) Prior Publication Data

US 2002/0133582 A1 Sep. 19, 2002

(30) Foreign Application Priority Data

Dec. 21, 2000 (JP) ............................. 2000-393280

(51) Int. Cl.
*G06F 15/173* (2006.01)

(52) U.S. Cl. ...................... 709/223; 709/227; 709/238; 709/242; 709/245; 370/401; 370/389; 370/392

(58) Field of Classification Search ................ 370/389, 370/392, 401, 465–473, 395.53, 395.1, 351; 709/223–224, 245, 238; 379/90.02, 93.31, 379/100.17; 710/105
See application file for complete search history.

(56) References Cited

U.S. PATENT DOCUMENTS

| | | | | |
|---|---|---|---|---|
| 5,623,605 A * | 4/1997 | Keshav et al. | ............... | 709/236 |
| 5,742,762 A * | 4/1998 | Scholl et al. | ............... | 709/200 |
| 6,023,724 A * | 2/2000 | Bhatia et al. | ............... | 709/218 |
| 6,128,664 A * | 10/2000 | Yanagidate et al. | ......... | 709/228 |
| 6,130,892 A * | 10/2000 | Short et al. | ................ | 370/401 |
| 6,154,839 A * | 11/2000 | Arrow et al. | ................ | 713/154 |
| 6,343,083 B1 * | 1/2002 | Mendelson et al. | ......... | 370/466 |
| 6,353,614 B1 * | 3/2002 | Borella et al. | ............... | 370/389 |
| 6,381,638 B1 * | 4/2002 | Mahler et al. | ............... | 709/220 |

(Continued)

FOREIGN PATENT DOCUMENTS

JP 06197132 A * 7/1994

(Continued)

OTHER PUBLICATIONS

Tsirtsis, G; Srisuresh, P. Campio Communications, RFC 2766: Network Address Translation—Protocol Translation (NAT-PT), Feb. 2000 Internet Society, Retrieved from: www.rfc-editor.org.*

(Continued)

*Primary Examiner*—Bunjob Jaroenchonwanit
*Assistant Examiner*—Dohm Chankong
(74) *Attorney, Agent, or Firm*—McDermott Will & Emery LLP

(57) ABSTRACT

Data communication is carried out between nodes each not having a global address. In a network management system in which a first network and a second network which have the different address systems are connected to each other through an address translator, each of the first and second networks has a node and a management protocol proxy; and each of the management protocol proxies includes a management protocol proxy data generating unit for treating, as management protocol proxy data, a transmission source address, a transmission destination address and data in a protocol data unit which are contained in a packet of a management protocol sent from the associated one of the nodes, and an address translation unit for translating the address information in the protocol data unit contained in the management protocol proxy data sent from the other management protocol proxy.

25 Claims, 23 Drawing Sheets

U.S. PATENT DOCUMENTS

| | | | |
|---|---|---|---|
| 6,389,462 B1* | 5/2002 | Cohen et al. | 709/218 |
| 6,449,279 B1* | 9/2002 | Belser et al. | 370/397 |
| 6,493,765 B1* | 12/2002 | Cunningham et al. | 709/245 |
| 6,515,974 B1* | 2/2003 | Inoue et al. | 370/331 |
| 6,523,068 B1* | 2/2003 | Beser et al. | 709/238 |
| 6,523,696 B1* | 2/2003 | Saito et al. | 709/223 |
| 6,535,511 B1* | 3/2003 | Rao | 370/392 |
| 6,563,824 B1* | 5/2003 | Bhatia et al. | 370/392 |
| 6,567,405 B1* | 5/2003 | Borella et al. | 370/389 |
| 6,581,108 B1* | 6/2003 | Denison et al. | 709/245 |
| 6,629,137 B1* | 9/2003 | Wynn | 709/223 |
| 6,631,416 B2* | 10/2003 | Bendinelli et al. | 709/227 |
| 6,687,732 B1* | 2/2004 | Bector et al. | 709/200 |
| 6,725,264 B1* | 4/2004 | Christy | 709/225 |
| 6,731,642 B1* | 5/2004 | Borella et al. | 370/401 |
| 6,735,626 B1* | 5/2004 | Tezuka et al. | 709/223 |
| 6,754,709 B1* | 6/2004 | Gbadegesin | 709/227 |
| 6,801,528 B2* | 10/2004 | Nassar | 370/389 |
| 6,822,957 B1* | 11/2004 | Schuster et al. | 370/389 |
| 6,832,322 B1* | 12/2004 | Boden et al. | 726/15 |
| 6,888,837 B1* | 5/2005 | Cunningham et al. | |
| 6,892,245 B1* | 5/2005 | Crump et al. | 709/245 |
| 6,937,574 B1* | 8/2005 | Delaney et al. | 370/254 |
| 6,996,628 B2* | 2/2006 | Keane et al. | 709/238 |
| 7,003,481 B2* | 2/2006 | Banka et al. | 705/26 |
| 2002/0010799 A1* | 1/2002 | Kubota et al. | 709/249 |
| 2002/0023210 A1* | 2/2002 | Tuomenoksa et al. | 713/161 |
| 2002/0026531 A1* | 2/2002 | Keane et al. | 709/250 |
| 2002/0065938 A1* | 5/2002 | Jungck et al. | 709/246 |
| 2002/0114322 A1* | 8/2002 | Xu et al. | 370/352 |
| 2002/0159447 A1* | 10/2002 | Carey et al. | 370/389 |
| 2002/0165982 A1* | 11/2002 | Leichter et al. | 709/244 |
| 2003/0055947 A1* | 3/2003 | Haneda | 709/224 |
| 2003/0088767 A1* | 5/2003 | Emerson, III | 713/153 |
| 2003/0131116 A1* | 7/2003 | Jain et al. | 709/230 |

FOREIGN PATENT DOCUMENTS

| | | |
|---|---|---|
| JP | 09-331325 | 12/1997 |
| JP | 11-187058 | 7/1999 |
| JP | 2000-232480 | 8/2000 |
| JP | 2001268132 A * | 9/2001 |
| WO | WO 99/41937 | 8/1999 |

OTHER PUBLICATIONS

Raz, D., Lucent Technologies; Schoenwaelder, J., Tu Braunschweig; Sugla, B., ISPSoft Inc., RFC: 2962: An SNMP Application Level Gateway for Payload Address Translation, Oct. 2000, Internet Society, Retrieved from: www.rfc-editor.org.*

Egevang, K. Cray Communications; Francis P., NTT, RFC: 1631: Network Address Translator, May 1994, Internet Society, Retrieved from : www.rfc-editor.org.*

Case J. SNMP Research; Fedor M. & Schoffstall M. Performance Systems International; Davin, J. MIT Labotory for Computer Science, RFC: 1157: Simple Network Management Protocol (SNMP), May 1990 Internet Society, Retrieved from:www.rfc-editor.org.*

Okazaki, Naomobu; Baba, Yoshimasa; Ideguchi, Tetsuo; Nakata, Ken-ichi; Park, Mi Rang; Seno, Shoichiro; An Efficient Method for Private Network Management Using IP Address Translation (2001) ,T.IEE Japan, vol. 121-C, No. 10.*

Sugla B. , Rax, D. Ecomomically Managing Multiple Private Data Networks (200) IEEE, ISN:0-7809-5864-3.*

Bll Labs Innovations, Software Tool Helps Lucent Manage Customers' Networks (1999). Lucent Technologies.*

* cited by examiner

FIG. 16

69 OTHER PARTY PROXY DEFINITION

| TRANSMISSION DESTINATION ADDRESS | OTHER PARTY PROXY ADDRESS | |
|---|---|---|
| 100. *. *. * | 200. 10. 20. 30 | ~311 |
| 101. 10. *. * | 200. 10. 20. 30 | ~312 |
| 110. 20. 80. * | 210. 25. 15. 5 | ~313 |
| 120. 60. 11. 8 | 230. 51. 62. 72 | ~314 |

FIG. 22

| TRANSMISSION DIRECTION | TRANSLATION DIRECTION | KIND OF PDU |
|---|---|---|
| FROM MANAGER SIDE TO MANAGED NODE SIDE | TRANSLATION FROM REAL ADDRESS TO MANAGEMENT ADDRESS | Get-Request,Getnext-Request,Set-Request |
| FROM MANAGED NODE SIDE TO MANAGER SIDE | TRANSLATION FROM REAL ADDRESS TO MANAGEMENT ADDRESS | Get-Response,Trap |

65 ADDRESS TRANSLATION DEFINITION

| ADDRESS FOR MANAGEMENT | REAL ADDRESS | |
|---|---|---|
| 100. *. *. * | 10. *. *. * | ~301 |
| 101. 10. *. * | 172. 16. *. * | ~302 |
| 110. 20. 80. * | 172. 17. 50. * | ~303 |
| 120. 60. 11. 8 | 192. 168. 20. 5 | ~304 |

NETWORK MANAGEMENT SYSTEM

BACKGROUND OF THE INVENTION

The present invention relates in general to a network management system. More particularly, the invention relates to a network management system for managing a network system to which a plurality of networks the address systems of which are different from one another are connected.

IP addresses as network addresses which are currently most widely utilized in the Internet and the like are prescribed in accordance with the protocol called the IPv4 (Internet Protocol ver. 4) and also are addresses each having the address space of 32 bits. The network addresses must be uniquely allocated to apparatuses connected to the network, respectively, and hence the allocation of the network addresses to the apparatuses connected to the Internet has been carried out by the organ called NIC or the like in such a way as to become unique. Since in the IPv4, each of the IP addresses has the address space of 32 bits, the addresses of 2 to the 32-th power, i.e., four billions at maximum can be theoretically allocated. However, as the number of apparatuses connected to the Internet is increased, it becomes difficult to allocate the IP addresses of the IPv4 to all of the apparatuses connected to the Internet.

The technique which is widely used as the technique for solving the above-mentioned problem is the method wherein the address translation function described in RFC1631 (The IP Network Address Translator) decided by the IETF is combined with the private network described in RFC1918 (Address Allocation for Private Internets). The method is established on the assumption that for example, all of the apparatuses which are present in the local network such as the network within industry are not necessarily connected to the external network such as the Internet. In other words, first of all, the local network such as network within industry allocates the IP address using the address which falls within the private address described in RFC1918 to construct the network. At this time, with this private address, the associated apparatuses are not connected to the external network such as the Internet. With respect to the apparatuses connected to the external network such as the Internet, the address translator described in RFC1613 is disposed between the local network and the external network such as the Internet, and the address of the transmission/reception packet is translated through the address translation from the private address into the global address with which the access is given to the Internet, thereby making the connection to the Internet possible. Now, by the global address is meant the address which is allocated by the NIC or the like. At this time, there is also made the device in which the infinite global addresses are effectively utilized in such a way that the global addresses are dynamically allocated to make it possible that a plurality of local nodes hold one global address in common on the basis of the time-sharing.

Now, in the address translation described in RFC1631, the rewriting of the transmission source IP address and the transmission destination IP address which are contained in the header of the IP packet, and the change of the check sum of the IP header which is generated along with the rewriting are recalculated to replace them with each other. As a result, the communication by TCP/IP becomes possible, and the communication according to the protocol of the upper layer with respect thereto also becomes possible.

However, though in the network management protocol such as the SNMP, the IP address is contained in a protocol data unit (PDU) as well in which the data is exchanged in accordance with the management protocol, this part is not subjected to the address translation in the address translator described in RFC1631.

On the other hand, in JP-A-11-187058, in addition to the function of the address translation described in RFC1631, the address translator having the function of carrying out the address translation with respect to the protocol data unit as well of the management protocol is described.

SUMMARY OF THE INVENTION

However, if the operation based on the private address and the global address is carried out by the address translator, then this operation will be carried out through the communication in accordance with the management protocol using the global address which can be used in the network on the side of the manager node. For this reason, the communication in accordance with the management protocol can be carried out only with the node which is located on the managed side and to which the global address is already allocated. However, if in the network management, the management can be carried out for the node as well which has not such a global address allocated thereto, it becomes possible to carry out the more effective management. This respect is not disclosed in the method described in JP-A-11-187058.

In the light of the foregoing, the present invention has been made in order to solve the above-mentioned problems associated with the prior art, and it is therefore an object of the present invention to provide a network management system in which the data communication in accordance with a management protocol can be carried out even between nodes each not having a global address in a network system in which networks of different address systems are connected to one another through an address translator.

As one means for attaining the above-mentioned object, according to the present invention, there is provided a network management system for managing a network system in which a first network and a second network which are different in address system from each other are connected to each other through an address translator, wherein each of the first and second networks includes a node and a management protocol proxy, and each of the management protocol proxies includes a management protocol proxy data generating unit for treating, as the management protocol proxy data, a transmission source address, a transmission destination address and data in a protocol data unit which are contained in a packet of a management protocol sent from a node, and an address translation unit for translating address information within a protocol data unit contained in management protocol proxy data sent from another management protocol proxy.

As a result, it is possible to carry out the data communication between the proxies of the management protocol, and it is also possible to carry out the data communication between the nodes each not having the global address.

BRIEF DESCRIPTION OF THE DRAWINGS

The above and other objects as well as advantages of the present invention will become clear by the following description of the preferred embodiments of the present invention with reference to the accompanying drawings, wherein:

FIG. 16 is a diagram showing a definition example of the other party proxy definition;

FIG. 22 is a diagram useful in explaining the relationship among a kind of PDU, the direction of transmitting a PDU and the translation direction of the address translation;

DESCRIPTION OF THE EMBODIMENTS

The preferred embodiments when an SNMP is applied to a management protocol will hereinafter be described in detail with reference to the accompanying drawings.

Figure 1:
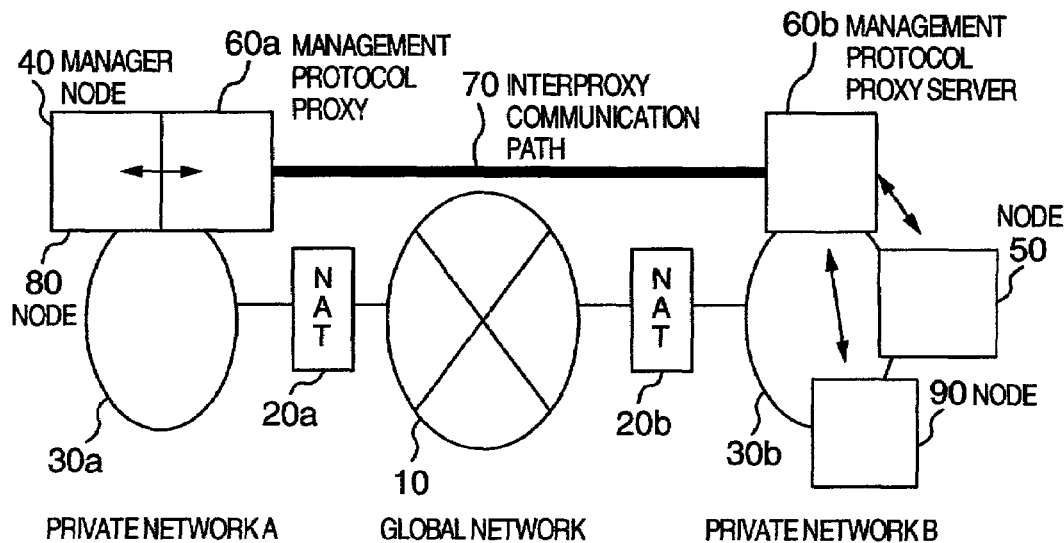
FIG. 1 is a diagram showing a basic configuration of a network system.

FIG. 1 is a diagram showing the concept of a network management system which will be described in the present embodiment.

The present system includes a global network 10, a private network A 30*a* and a private network B 30*b*. Then, the private network A 30*a* is connected to the global network 10 through an NAT 20*a* for carrying out the address translation, while the private network B 30*b* is connected to the global network 10 through an NAT 20*b* for carrying out the address translation.

A node 80 for carrying out the monitoring is connected to the private network A 30*a*. This node 80 includes a manager 40 for executing the processing for monitoring managed nodes, and a management protocol proxy 60*a* for carrying out the generation of proxy data of the management protocol, the address translation within a protocol data unit contained in the proxy data, and the like.

In addition, nodes 50 and 90 as the managed nodes, and the management protocol proxy server 60*b* for carrying out the generation of proxy data of the management protocol, the address translation within a protocol data unit contained in the proxy data, and the like are connected to the private network B 30*b*.

In such a configuration, in the present network management system, the node 80 for carrying out the monitoring is adapted to manage the nodes 50 and 90 as the managed nodes.

When the data communication is intended to be carried out with the node 50 as the managed node through the manager 40 of the node 80 of the private network 30*a*, the data communication is carried out between the management protocol proxy 60*a* of the node 80 and the management protocol proxy server 60*b* of the private network B 30*b*. This becomes equivalent to that a virtual communication path called an interproxy communication path 70 is formed.

If such a configuration is adopted, then the data communication can be carried out between the networks when the address used in the private network A 30*a* is different from that used in the private network B 30*b*, i.e., when their address systems are different from each other. In addition, even in the case where a fire wall or the like which is adopted to block the passage of any of the addresses of the private networks and the address of the global network is formed between the private network A 30*a* and the private network B 30*b*, the data communication can be made possible.

The operation of the overall network system shown in FIG. 1 will hereinbelow be described more concretely.

Figure 2:
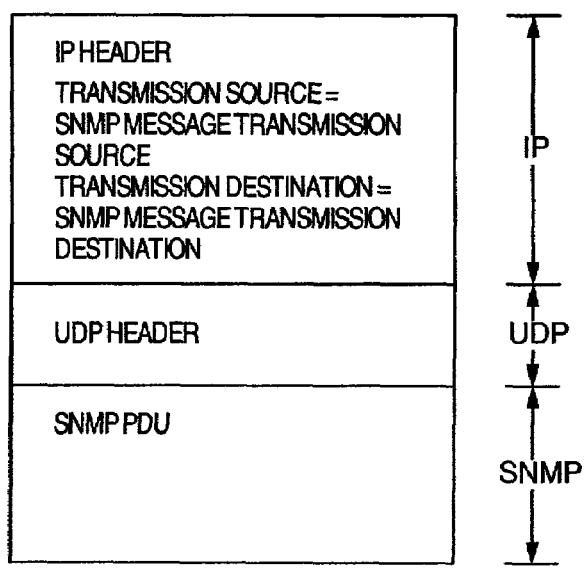
FIG. 2 is a diagram showing a structure of a packet of an SNMP message.
Figure 3:
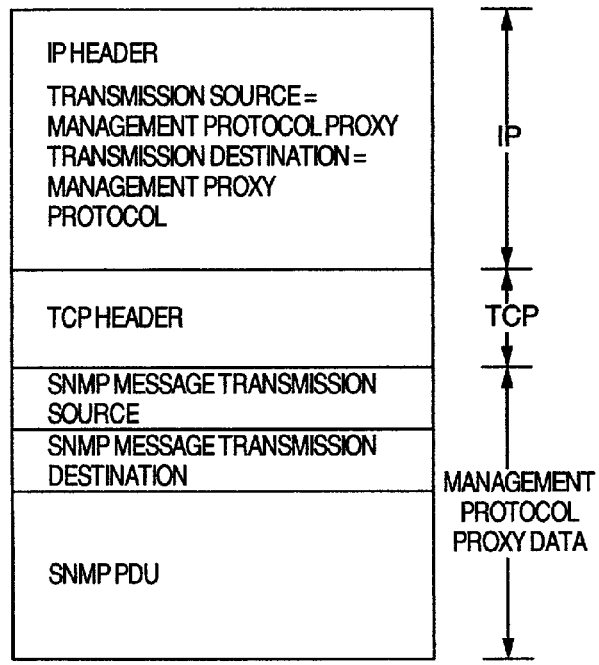
FIG. 3 is a diagram showing a structure of a packet of management protocol proxy data.

FIG. 2 is a diagram showing an SNMP message packet of a management protocol SNMP of the node. FIG. 3 is a diagram showing a packet of management protocol proxy data of the management protocol proxy server. That is, the management protocol proxy 60*a* and the management protocol proxy server 60*b* store the transmission source information and the transmission destination information which have been respectively held as the transmission destination and the transmission source within the header of an IP layer as a network layer in the management protocol proxy data corresponding to the data of an application layer from the packets of the management protocol SNMPs which have been respectively sent from the manager 40 of the node 80, and the node 50 and the node 90 as the managed nodes. Further, as for a transport layer of the packet of the management protocol proxy data, for example, a TCP of a connection type is employed. In addition, the transmission destination and the transmission source of the management protocol proxy data itself become the management protocol proxy or the management protocol proxy server.

Now, the description will hereinbelow be given with respect to the flow of the data when the communication is carried out from the manager 40 to the node 50 or the node 90 as the managed node and in the direction opposite thereto, i.e., from the node 50 or the node 90 as the managed node to the manager 40 through the management protocol proxy 60a and the management protocol proxy server 60b. At the time when the data of the management protocol sent by the node 40 as the manager has been delivered to the management protocol proxy 60a, the management protocol proxy 60a combines the data itself of the management protocol with the information exhibiting the essential transmission destination and transmission source of the data of the management protocol to generate the management protocol proxy data and sends the management protocol proxy data thus generated to the management protocol proxy server 60b. Then, the management protocol proxy server 60b fetches the data of the management protocol and the information exhibiting the essential transmission destination from the received management protocol proxy data to reconstruct the packet of the management protocol to send the packet thus reconstructed to the node 50 as the managed node which is the essential transmission destination. At this time, the transmission source of the packet of the management protocol is made the management protocol proxy server 60b, whereby the response from the node 50 is sent to the management protocol proxy server 60b. Then, the management protocol proxy server 60b which has received the response packet of the management protocol from the node 50 translates that response packet into the management proxy protocol data to return the resultant management proxy protocol data back to the management protocol proxy 60a. Then, the management protocol proxy 60a reconstructs the response packet of the management protocol from the management protocol proxy data to return the resultant response packet back to the manager 40.

In such a manner as described above, in the environment in which the communication can not be directly carried out between the nodes using the management protocol, the communication in accordance with the management protocol can be carried out through the management protocol proxy and the management protocol proxy server.

Further, each of the management protocol proxy and the management protocol proxy server includes an address translation function of translating the address of the PDU part of the management protocol. As a result, the address of the node contained in the protocol data unit (hereinafter, referred to as "the PDU" for short, when applicable) of the management protocol of the node is translated into the virtual address which is used to manage the network, whereby the management can be carried out as if the node has the virtual address. The virtual address which is used only in the network management at this time is referred to as "the management address" for short when applicable in the present embodiment for the sake of convenience.

By the way, while in the configuration shown in FIG. 1, the description has been given with respect to the case where the management protocol proxy 60a is realized in the form of the program, similarly, the function of the management protocol proxy server 60b can also be realized in the form of the program. In this case, the program is recorded in a magnetic disk, an optical disc or a magneto-optical disc from which the data can be read out by a computer, and the node which takes charge of the function of the management protocol proxy server is adapted to read out the program to execute the program.

Next, the NAT shown in FIG. 1 will herein-below be described. Each of the NATs shown in FIG. 1 is in conformity to RFC1631.

Figure 4:
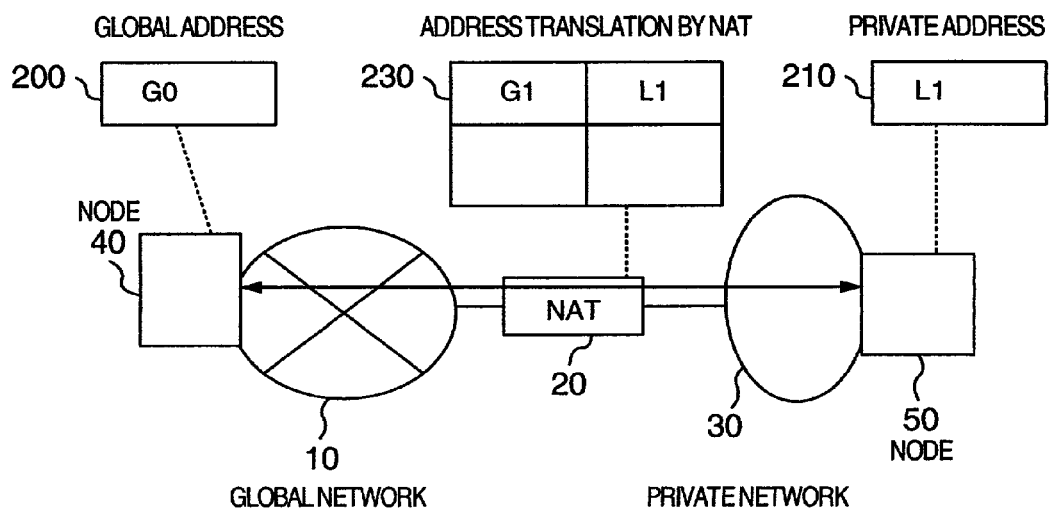
FIG. 4 is a diagram useful in explaining a function of an NAT.
Figure 5:
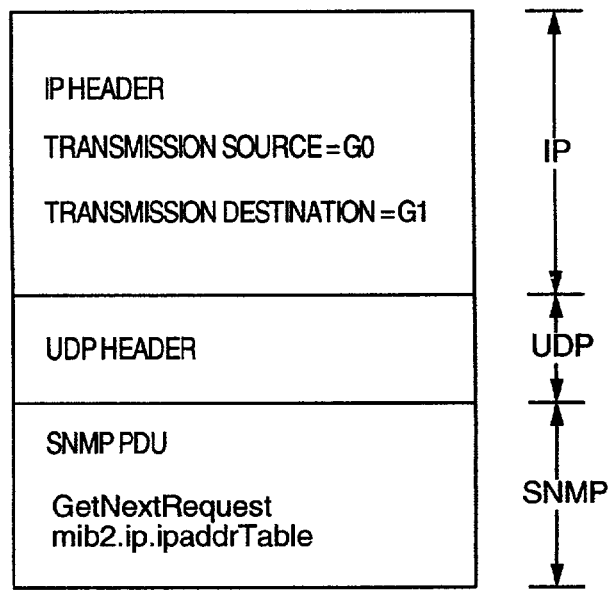
FIG. 5 is a diagram showing a structure of a packet of an SNMP message.
Figure 6:
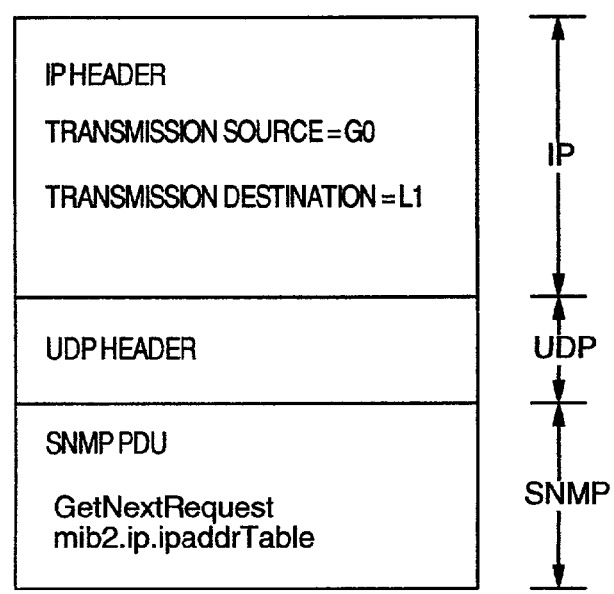
FIG. 6 is a diagram showing a structure of a packet of an SNMP message.

FIG. 4 is a diagram useful in explaining the function of the NAT. As shown in the figure, the description will hereinbelow be given with respect to the case where in the network in which a global network 10 and a private network 30 are connected to each other through an NAT 20, an address G0 is allocated as a global address 200 to a node 40, an address L1 is allocated as a private address 210 to the managed node, and an address G1 is allocated as the global address 200 to the managed node. In this case, a translation table 230 in which the global address and the private address are made correspond to each other is provided in the NAT 20. As a result, the packet, with respect to the address G1, is transmitted from the node 40 side to the node 50 side. The NAT 20 translates the transmission destination address of the packet directed to the address G1 from the global address G1 to the private address L1 in accordance with the translation table 230 to transmit the resultant address to the private network side. That is, when having reached the NAT 20 from the node 40 side as shown in FIG. 5, the packet of interest is the packet in which the information of the address G1 for the transmission destination is contained as the header information of the IP layer part corresponding to the network layer, while when being relayed from the NAT 20 towards the node on the private network side, is transmitted as the packet in which the information of the address L1 is contained as the header information of the IP layer part as shown in FIG. 6 in the transmission destination. On the other hand, in the case where the packet is transmitted from the node 50 on the private network side towards the node 40 on the global network side, when having reached the NAT 20 from the node 50, the packet of interest is the packet in which the information of L1 for the transmission source is contained as the header information of the IP layer part, while when being relayed from the NAT 20 towards the node 40 on the global network side, is transmitted as the packet in which the information of G1 for the transmission source is contained as the header information of the IP layer part.

On the basis of such a function of the NAT 20, as for the setting of the network of the node 50 itself, the setting has only to be made in such a way that the network of the node 50 itself has the private address L1. Then, when the node 50 is intended to communicate with another apparatus within the private network, the communication can be carried out using the private address L1. In addition, when the communication is intended to be carried out with the apparatus on the global network side, the communication can be carried out using the global address G1 allocated by the NAT 20.

By the way, in this case, the NAT has been described as the translator having the function of carrying out the address translation of the IP layer (the address translation of the PDU part of the management protocol can not be carried out). In the network utilizing such an NAT, as has already been described, the address of the PDU part of the management protocol is translated in the management protocol proxy server.

The more concrete network system will herein-below be described.

Figure 7:
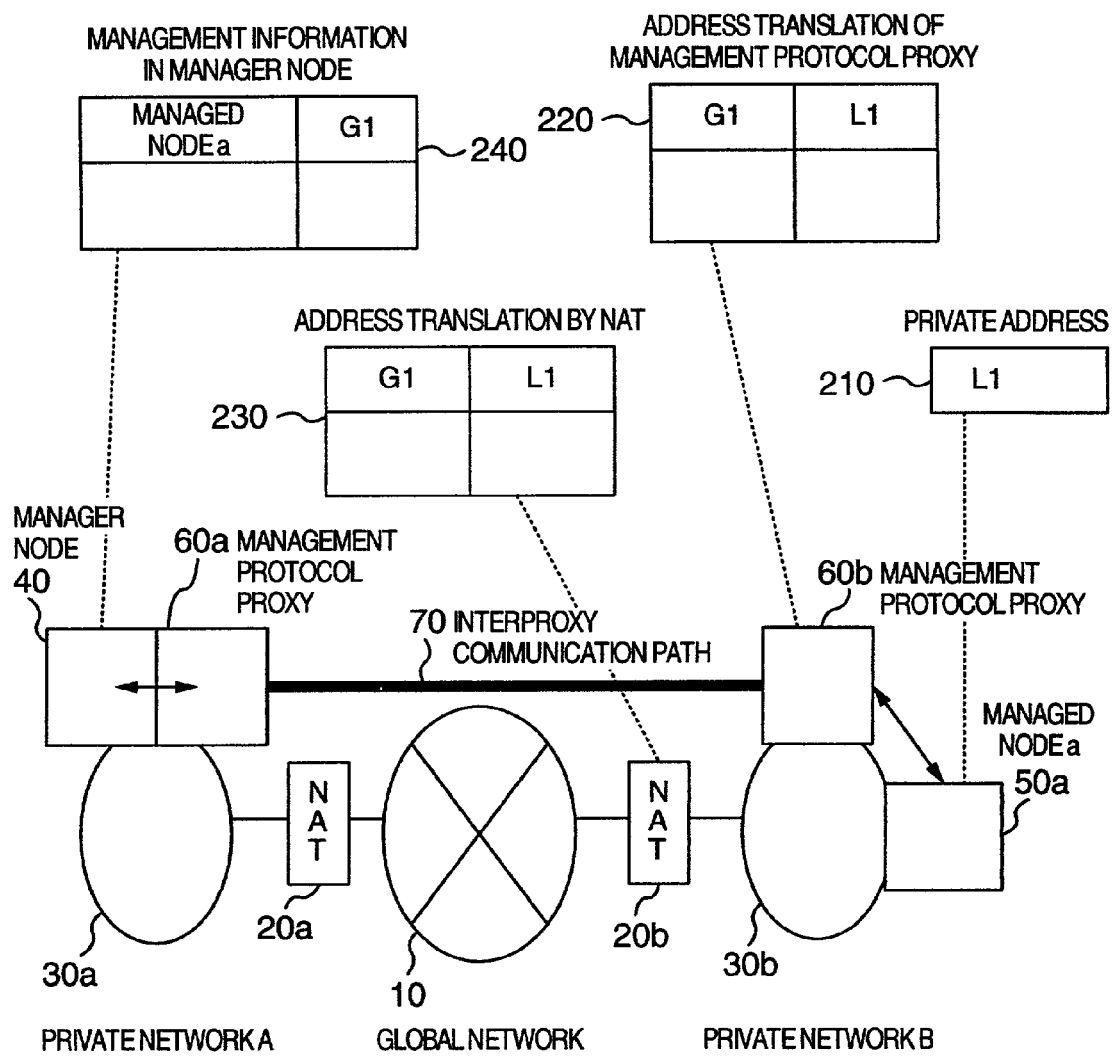
FIG. 7 is a diagram showing one application example in a virtual network management system.

FIG. 7 is one of application examples in the network management system and shows a configuration in the case where the management is carried out by using the proper global address allocated to a managed side node as the address which is used to manage the network.

A managed node a 50a has the address L1 as the private address 210. This address of L1 is the private address, and hence is the address which can be used only in the private network B 30b.

Furthermore, as for address translation 230 in the NAT 20b, the global address G1 is made correspond to the private address L1, and the address G1 is statically allocated as the global address to the managed node a 50a. When the global network 10 or the private network A 30a is intended to communicate directly with the managed node a 50a, the communication is carried out using the global address G1.

Now, as for address translation 220 in the management protocol proxy 60b, the management address G1 is made correspond to the private address L1, whereby with respect to the management protocol data which is to be sent from the managing side to the managed side, the global address G1 is translated into the private address L1, while with respect to the management protocol data which is to be sent from the managed side to the managing side, the private address L1 is translated into the global address G1.

As a result, if reference is made to the data of the management protocol using the management protocol from the manager side, the managed node a 50a seems to be as if it has the global address G1.

For this reason, as for the management information 240 in the manager 40, the managed node a 50a is made correspond to the apparatus having the address G1, and hence the network management can be carried out using the address G1.

Figure 8:
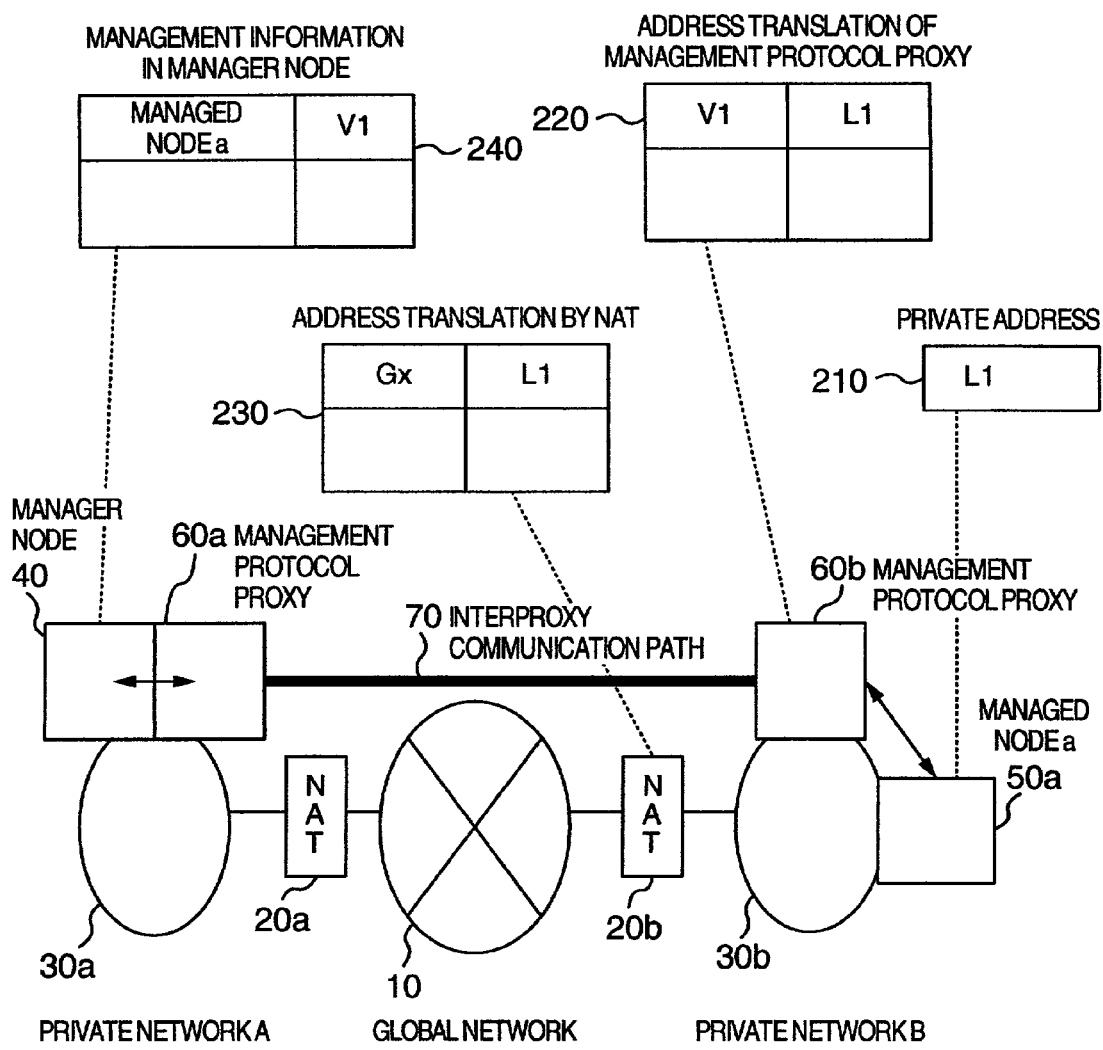
FIG. 8 is a diagram showing one application example in a virtual network management system.

Next, FIG. 8 shows the case where the global address to be allocated to the managed node by the NAT 20b is dynamically allocated thereto.

In general, the number of global addresses which can be used for the external connection in the private networks which are connected through the NATs is less than the number of apparatuses within the private networks. As for the method of utilizing effectively the less global addresses, there is employed the method wherein the allocation of the global address to the apparatus is carried out only for a period of time when the apparatus of interest is connected to the outside, and at the time when the connection of the apparatus of interest to the outside has been completed, the global address which the apparatus of interest has used is adapted to be reutilized by another apparatus. In the case where the global addresses are dynamically allocated in such a manner, in general, the global address which is allocated to a certain one apparatus differs as the case may be.

In such a case, as the address translation 230 in the NAT 20b, the global address Gx is made correspond to the private address L1. Then, the global address Gx is the address which is selected among the addresses of the fixed choices as the case may be, and hence the address Gx is dynamically allocated as the global address to the managed node a 50a at least at that time. What address is allocated is determined by the NAT 20b.

Now, if the address Gx is used as the management address as it is, then the address which is made correspond as the management information 240 in the manager 40 to the managed node a 50a changes as the case may be, and hence the continuation of the management can not be maintained so that the proper network management can not be carried out. This is a problem.

Then, as for the address translation 220 in the management protocol proxy 60b, as shown in FIG. 8, the virtual address of V1 which is completely different from the address Gx is statically allocated. As a result, as for the management information 240 in the manager, the managed node a 50a is made correspond to the apparatus having the address V1 and hence the network management can be properly carried out.

Figure 9:
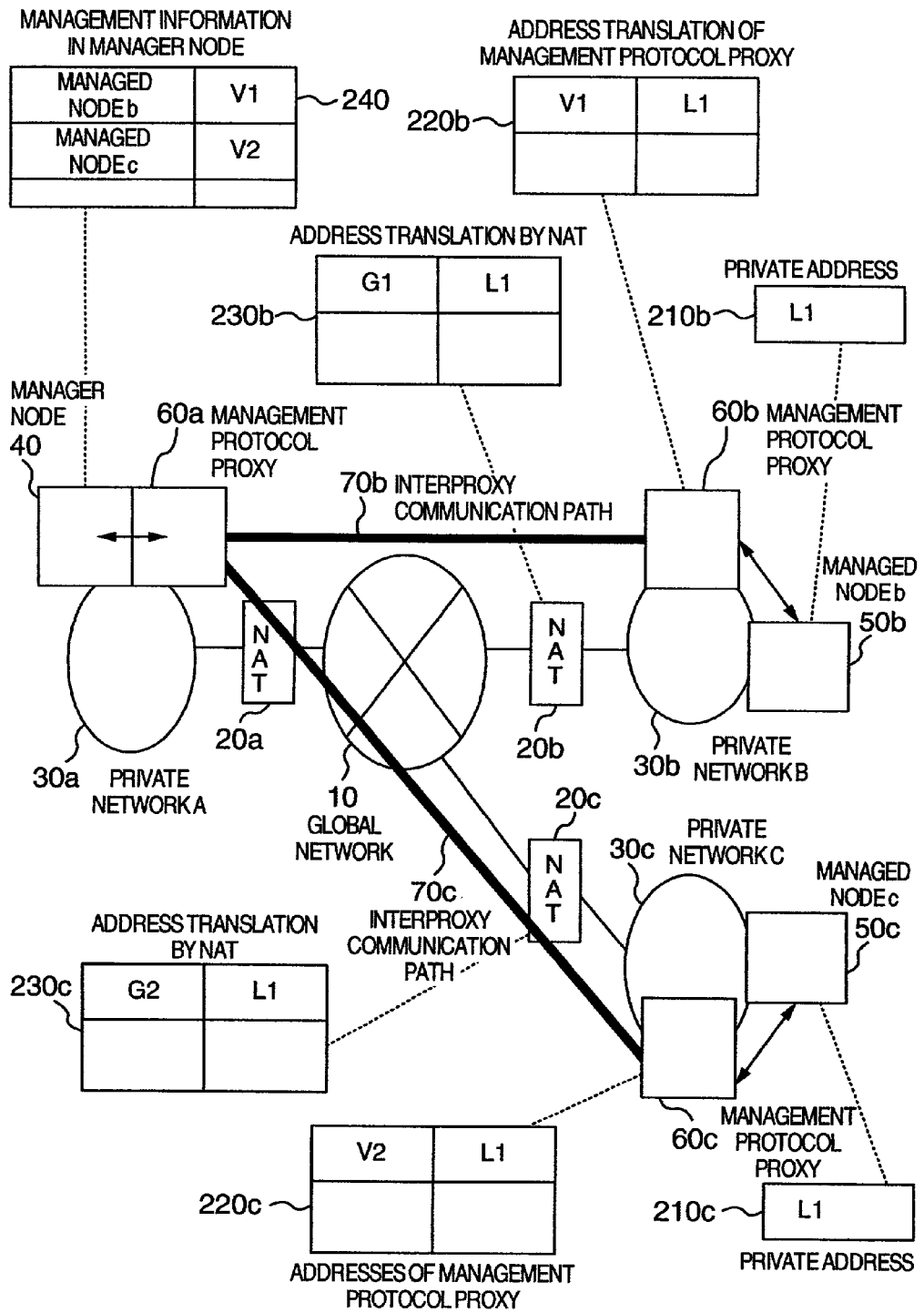
FIG. 9 is a diagram showing one application example in a virtual network management system.

FIG. 9 shows an example in the case where there are a plurality of private networks on the managed side, and the private addresses of the managed nodes within these private networks compete with one another.

A managed node b 50b is present in the private network B 30b and has the private address L1. On the other hand, a managed node c 50c is present in a private network C 30c and has the private address L1. While the respective addresses conflict with each other, since the private address is used only within the associated one of the private networks in terms of the communication, the networks are not confused at all.

However, if the management protocol data is directly acquired from the managed node b 50b and the managed node C 50c using the management protocol, since both of these apparatuses respond to the information as the apparatus having the private address L1, there arises the problem that the manager is confused so that the network management can not be properly carried out.

Then, as shown in FIG. 9, with respect to the managed node b 50b, the management address V1 is made correspond to the private address L1 during the address translation 220b in the management protocol proxy 60b, while with respect to the managed node C 50c, the management address V2 is made correspond to the private address L1 during the address translation 220c in the management protocol proxy 60c. That is, the management address V1 and the management address V2 are statically allocated to the managed node b 50b and the managed node c 50c, respectively.

As a result, as for the management information 240 in the manager, the managed node b is decided as the apparatus having the management address V1, and the managed node c is decided as the apparatus having the management address V2 so that the network management can be properly carried out.

Figure 10:
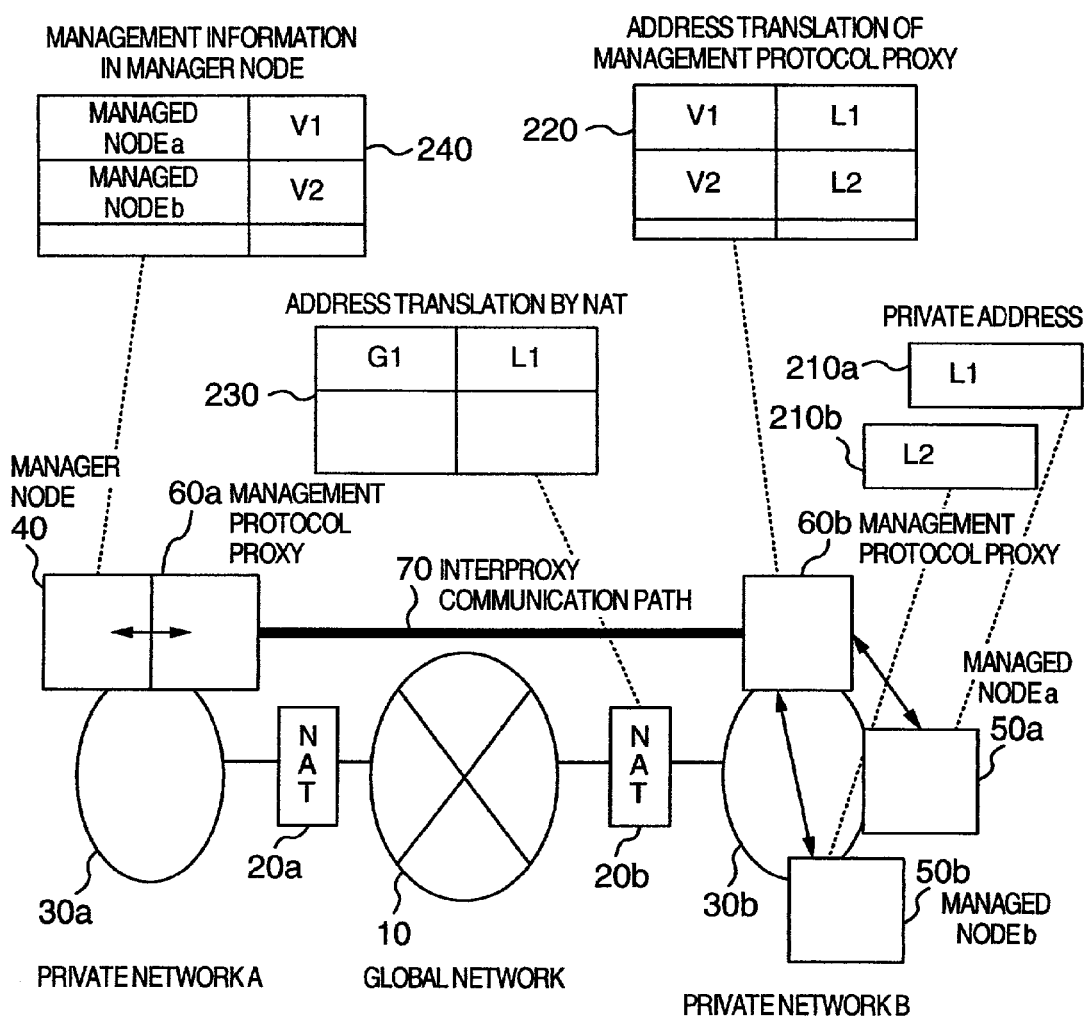
FIG. 10 is a diagram showing one application example in a virtual network management system.

FIG. 10 shows an example in the case where the management address is allocated to even the apparatus to which the global address is not allocated, i.e., which is not connected to the outside in order to carry out the network management in the private network.

A managed node a 50a has the address L1 as the private address 210a. In addition, as for the address translation 230 in the NAT 20b, the global address G1 is made correspond to the private address L1, and the address G1 is statically allocated as the global address to the managed node a 50a. When the global network 10 or the private network A 30a intends to communicate directly with the managed node a 50a, the communication is carried out using the global address G1.

On the other hand, the managed node b 50b has the address L2 as the private address 210b. However, as for the address translation 230 in the NAT 20b, the global address corresponding to the private address L2 is not defined, and hence the global network 10 or the private network A 30a can not communicate directly with the managed node b 50b. But, in this case as well, the manager 40 can exchange the information with the managed node 50 as well in accordance with the management protocol through the management protocol proxy.

At this time, during the address translation 220 in the management protocol proxy 60b, the management address V1 is made correspond to the private address L1, and also the management address V2 is made correspond to the private address L2. That is, the management address V1 is statically allocated to the managed node a 50a, and also the management address V2 is statically allocated to the managed node b 50b. As a result, as for the management information 240 in the manager, the managed node a 50a is decided as the apparatus having the management address V1, and the managed node b 50b is decided as the apparatus having the management address V2 in order to carry out the network management.

Figure 11:
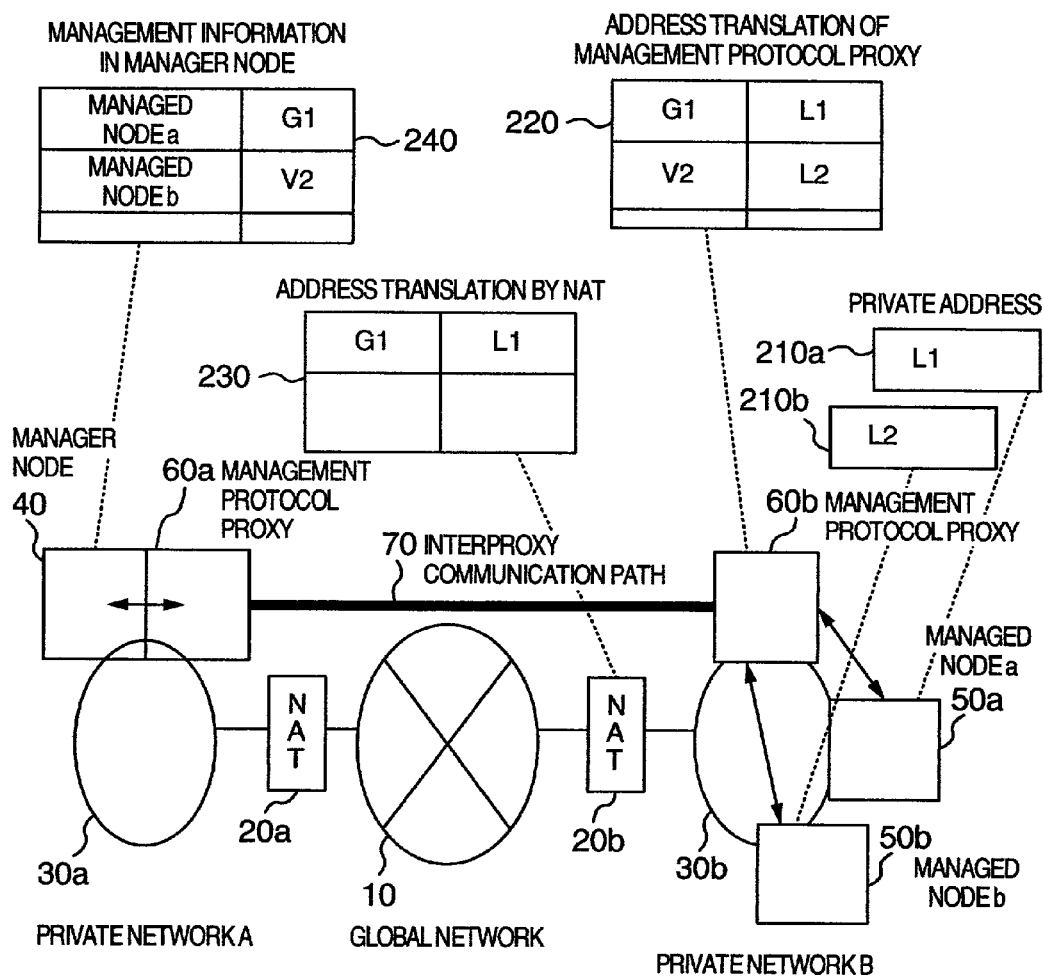
FIG. 11 is a diagram showing one application example in a virtual network management system.

FIG. 11 shows an example in which when the management address is allocated to even the apparatus to which the global address is not allocated, i.e., which is not connected to the outside in the private network in order to carry out the network management, with respect to the apparatus to which the global address is allocated, the global address is used for the management address, while with respect to the apparatus to which the global address is not allocated, the virtual address is used therefor.

The managed node a 50a has the address L1 as the private address 210a. In addition, as for the address translation 230 in the NAT 20b, the global address G1 is made correspond to the private address L1, and the address G1 is statically allocated as the global address to the managed node a 50a. When the global network 10 or the private network A 30a intends to communicate directly with the managed node a 50a, the communication is carried out using the global address G1.

On the other hand, the managed node b 50b has the address L2 as the private address 210b. However, as for the address translation 230 in the NAT 20b, the global address corresponding to the private address L2 is not defined, and hence the global network 10 or the private network A 30a can not communicate directly with the managed node b 50b. But, in this case as well, the manager 40 can exchange the information with the managed node 50b as well in accordance with the management protocol through the management protocol proxy.

At this time, during the address translation 220 in the management protocol proxy 60b, the management address G1 is made correspond to the private address L1, and also the management address V2 is made correspond to the private address L2. That is, the management address G1 is statically allocated to the managed node a 50a and also the management address V2 is statically allocated to the managed node b 50b. As a result, as for the management information 240 in the manager, the managed node a 50a is decided as the apparatus having the address G1, and the managed node b 50b is decided as the apparatus having the address V2 in order to carry out the network management.

Subsequently, the configuration of the management protocol proxy will hereinbelow be described with reference to FIG. 12 and FIG. 13.

Figure 12:
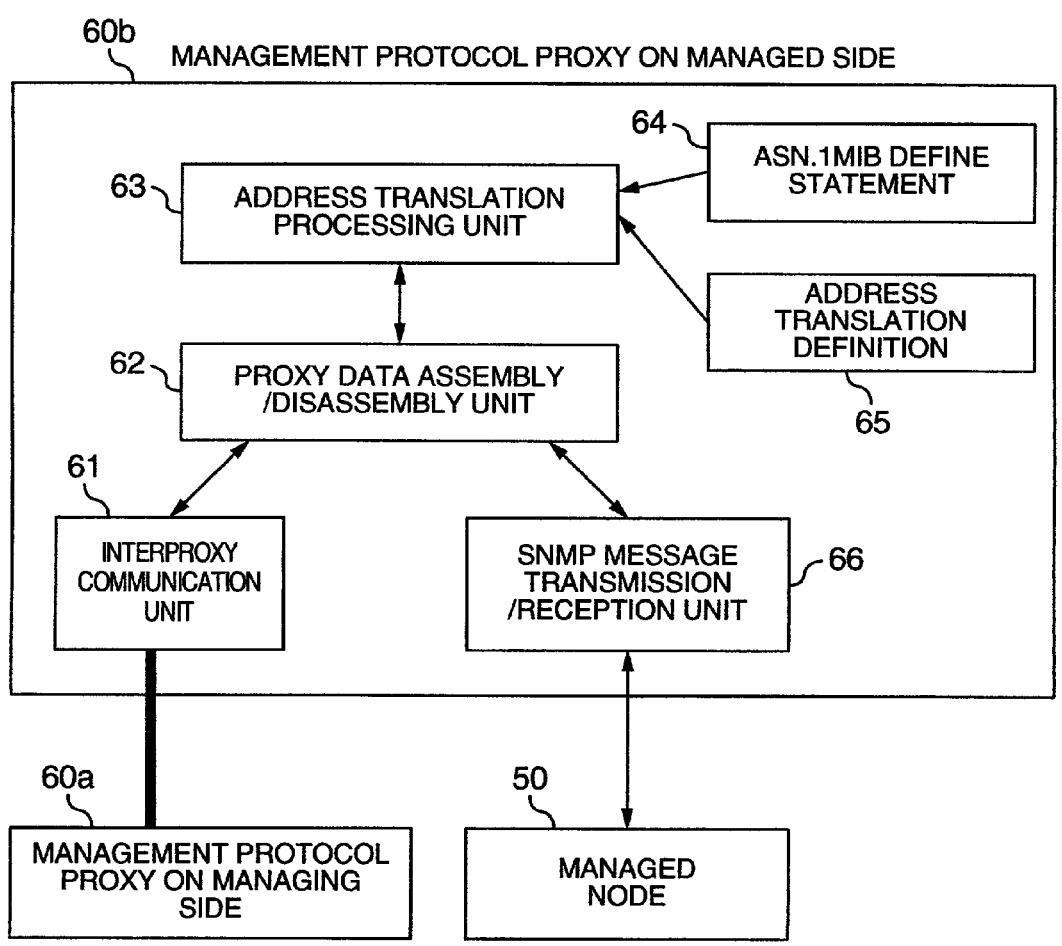
FIG. 12 is a block diagram showing a configuration of a management protocol proxy on the managed side.

FIG. 12 is a block diagram showing a configuration of the management protocol proxy on the managed side.

The management protocol proxy 60b on the managed side includes: an interproxy communication unit 61 for processing the establishment of the interproxy communication path 70 between the management protocol proxy 60a on the managing side and the unit 61 and the transmission/reception of the management protocol proxy data; a proxy data assembly/disassembly unit 62 for processing the disassembly/assembly management protocol proxy data; an address translation processing unit 63 for subjecting the address information within the PDU of the management protocol to the address translation; an ASN.1MIB define statement and an address translation definition 65 each of which becomes an input to the address translation processing unit; and an SNMR message transmission/reception unit 66 for transmitting/receiving the SNMP message between the managed node and the unit 66.

At the time when the message of the management protocol issued from the manager 40 has been translated into the management protocol proxy data by the management protocol proxy 60a on the managing side to be transmitted to the management protocol proxy on the managed side, first of all, the interproxy communication unit 61 receives the management protocol proxy data transmitted thereto to deliver the management protocol proxy data thus received to the proxy data assembly/disassembly unit 62. Then, the proxy data assembly/disassembly unit 62 disassembles the received management protocol proxy data to deliver the management protocol proxy data thus disassembled to the address translation processing unit 63. Then, the address translation processing unit 63 subjects the transmission source address data and the transmission destination address data of the management protocol proxy data thus delivered thereto and the address information within the PDU of the management protocol into the address translation in accordance with the ASN.1MIB define statement 64 and the address translation definition 65 to deliver the translation result to the proxy data disassembly/assembly unit 62. Then, the proxy data assembly/disassembly unit 62 fetches the transmission destination information, the transmission source information, and the PDU of the management protocol from the proxy data to deliver the information and the PDU thus fetched to the SNMP message transmission/reception unit 66. Then, the SNMP message transmission/reception unit 66 transmits the PDU of the management protocol to the managed node 50 which has been specified as the transmission destination. That is, the SNMP message transmission/reception unit 66 transmits the SNMP message to the managed node 50. Then, the managed node 50 returns the response corresponding to the SNMP message thus transmitted thereto back to the SNMP message transmission/reception unit 66. Then, the SNMP message transmission/reception unit 66 delivers the SNMP message of the response thus received, and the information of the transmission source and transmission destination thereof to the proxy data assembly/disassembly unit 62. Then, the proxy data assembly/disassembly unit 62 delivers the information of the transmission destination and the transmission source, and the PDU of the management protocol as the response to the address translation processing unit 63. Then, the address translation processing unit 63 subjects the transmission source address data and the transmission destination address data of the management protocol proxy data delivered thereto, and the address information within the PDU of the management protocol to the address translation to deliver the translation result to the proxy data disassembly/assembly unit 62. Then, the proxy data disassembly/assembly unit 62 assembles the information of the transmission destination and the transmission source, and the PDU of the management protocol in the form of the management protocol proxy data to deliver the data thus assembled to the interproxy communication unit 61. Then, the interproxy communication unit 61 transmits the management protocol proxy data to the management protocol proxy 60a on the managing side, and also the management protocol proxy 60a on the managing side returns the PDU of the management protocol back to the manager 40.

Now, the ASN.1MIB define statement 64 is the MIB define statement described by the ASN.1 (Abstract Syntax Notation One) which is the standard description method for the MIB object described in RFC1212 (Concise MIB Definition) and the like. In general, the MIB define statement by ASN.1 is widely open to the public by a person who had defined the MIB module thereof. In the present embodiment, since the address contained in Variable-Bindings of the protocol data unit of the management protocol is translated using the information which is obtained by analyzing the MIB define statement by ASN.1, the special define statement becomes unnecessary so that the configuration becomes simpler.

Figure 13:
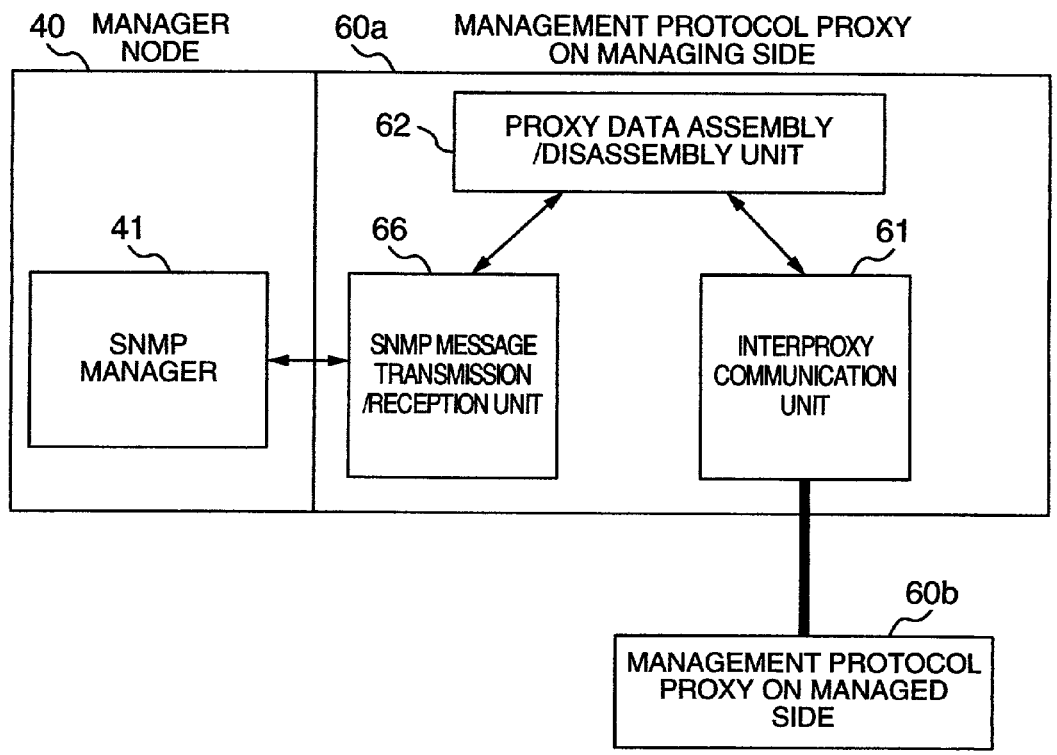
FIG. 13 is a block diagram showing a configuration of a management protocol proxy on the managing side.

FIG. 13 is a block diagram showing a configuration of the management protocol proxy on the managing side.

The management protocol proxy 60a on the managing side includes: an SNMP message transmission/ reception unit 66 for transmitting/receiving the SNMP message to/from an SNMP manager 41 on the manager 40; a proxy data assembly/disassembly unit 62 for processing the disassembly/assembly of the management protocol proxy data; and an interproxy communication unit 61 for processing the establishment of the interproxy communication path 70 distributed between the management protocol proxy 60b on the managed side and the unit 61, and the transmission/reception of the management protocol proxy data.

At the time when the SNMP message issued from the SNMP manager 41 on the manager 40 has been delivered to the management protocol proxy 60a on the managing side, the SNMP message transmission/reception unit 60 receives the SNMP message to deliver the SNMP message thus received to the proxy data assembly/ disassembly unit 62. Then, the proxy data assembly/ disassembly unit 62 assembles the management protocol proxy data from the SNMP message thus delivered thereto, and the information of the transmission destination and the transmission source thereof to deliver the management protocol proxy data thus assembled to the interproxy communication unit 61. Then, the interproxy communication unit 61 transmits the management protocol proxy data thus delivered thereto to the management protocol proxy 60b on the managed side. Further, the interproxy communication unit 61 receives the management protocol proxy data of the response returned from the management protocol proxy 60b on the managed side to deliver the management protocol proxy data thus received to the proxy data assembly/disassembly unit 62. Then, the proxy data assembly/disassembly unit 62 fetches the information of the transmission source and the transmission destination, and the SNMP message from the management protocol proxy data to deliver the information and the message thus fetched to the SNMP message transmission/ reception unit 66. Then, the SNMP message transmission/ reception unit 66 returns the SNMP message back to the SNMP message 41 on the manager 40 in accordance with the delivered information.

Figure 14:
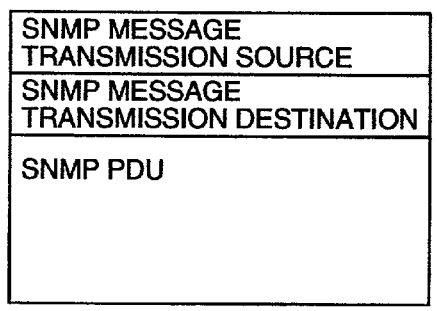
FIG. 14 is a diagram showing one example of management protocol proxy data.

FIG. 14 shows one example of the management protocol proxy data which is transmitted/received on the interproxy communication path 70 distributed between the management protocol proxy 60a on the manager side and the management protocol proxy 60b on the managed side, and also shows an example in the case where the management protocol is the SNMP. In this case, the management protocol proxy data is the data containing therein the information of the transmission source of the SNMP message, the information of the transmission destination of the SNMP message, and the SNMP PDU.

FIG. 2 is a diagram showing the packet of the normal SNMP message. By the way, the packet is shown only with respect to the upper part with respect to the IP layer as the network layer. In the normal SNMP packet, the information of the transmission source and the information of the transmission destination at the IP layer level become the transmission source and the transmission destination of the SNMP message itself as they are.

FIG. 3 is a diagram showing the packet of the management protocol proxy data in the case where the management protocol is the SNMP. By the way, the packet is shown only with respect to the upper part with respect to the IP layer as the network layer. In the packet of the management protocol proxy data, the transmission source or the transmission destination at the IP layer level is one of the management protocol proxies which are present in the both sides of the interproxy communication path 70, respectively, and the data of the transmission source and the transmission destination of the SNMP message is contained in the form of the management protocol proxy data corresponding to the application layer in the packet. Therefore, the virtual address which is used for the address translation is not used as the transmission destination or the transmission source address of the actual communication packet. For this reason, even if the virtual address is used which is not allocated from the organ such as the NIC to the organization thereof, this does not impede the communication at the IP layer, i.e., at the network layer level at all.

In such a manner as described above, the addresses of the SNMP message transmission source and transmission destination on the management protocol proxy data are subjected to the address translation, whereby the virtual address which is not the proper global address can be used in the management address, and hence the private network can be subjected to the network management including the apparatuses each not having the global address.

Next, the proxy data assembly/disassembly unit 62 will hereinbelow be described with reference to FIG. 15, FIG. 17 and FIG. 18.

Figure 15:
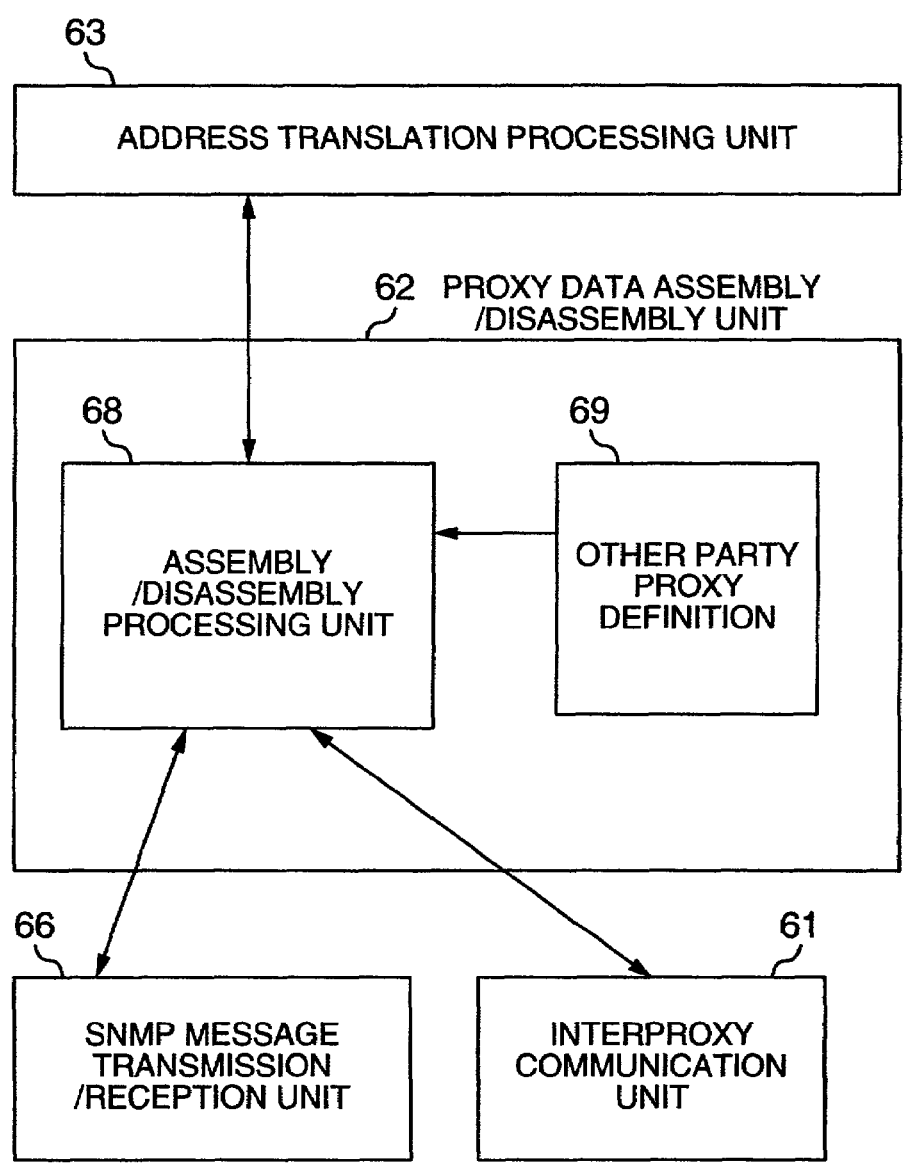
FIG. 15 is a block diagram showing a configuration of a proxy data disassembly/assembly unit.

FIG. 15 is a block diagram showing a configuration of the proxy data assembly/disassembly unit 62.

The proxy data assembly/disassembly unit 62 includes: an assembly/disassembly processing unit 68 for executing the assembly/disassembly processing; and the other party proxy definition 69 in which the correspondence relationship between the transmission destination of the SNMP message and the other party to which the SNMP message is to be transmitted is defined.

FIG. 16 shows a definition example of the other party proxy definition.

A definition line 311 is a definition line exhibiting that the SNMP message in which a first octet of the transmission destination address is 100 is transmitted to the management protocol proxy in which the address is 200.10.20.30.

A definition line 312 is a definition line exhibiting that the SNMP message in which a first octet of the transmission destination address is 101 and a second octet thereof is 10 is transmitted to the management protocol proxy in which the address is 200.10.20.30.

A definition line 313 is a definition line exhibiting that the SNMP message in which a first octet of the transmission destination address is 10, a second octet thereof is 20, and a third octet thereof is 80 is transmitted to the management protocol proxy in which the address is 230.51.62.72.

A definition line 314 is a definition line exhibiting that the SNMP message in which the transmission destination address is 120.60.11.8 is transmitted to the management protocol proxy in which the address is 230.51.62.72.

By the way, the transmission address at this time is represented using the management address.

Figure 17:
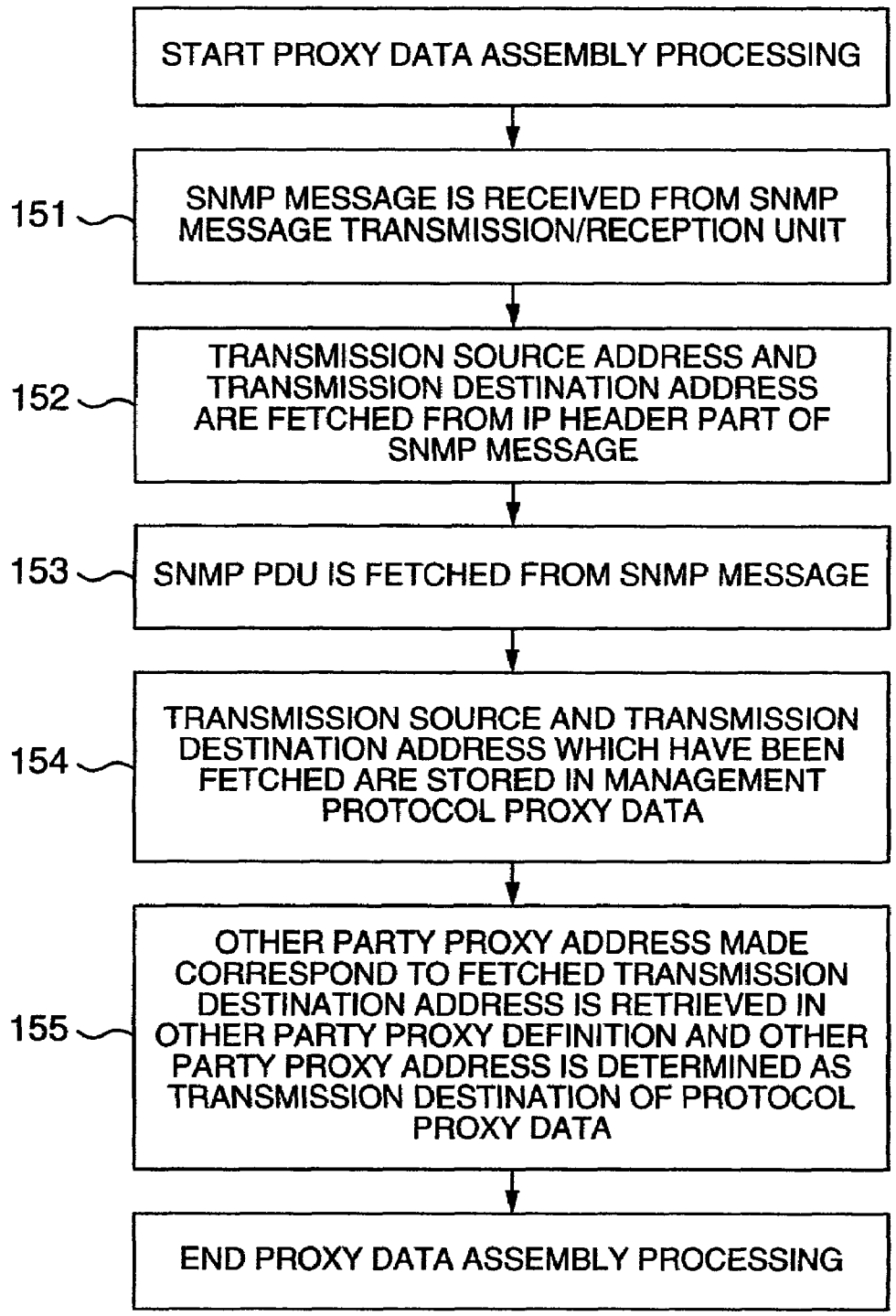
FIG. 17 is a flow chart useful in explaining the processing of assembling proxy data.

FIG. 17 shows a flow chart useful in explaining the proxy data assembly processing.

In Step 151, the SNMP message is received from the SNMP message transmission/reception unit.

In Step 152, both of the transmission source address and the transmission destination address are fetched from the IP header part of the SNMP message.

In Step 153, the SNMP PDU is fetched from the SNMP message.

In Step 154, the transmission source address, the transmission destination address and the SNMP PDU which have been fetched from the IP header part of the SNMP message are stored in the management protocol proxy data. In Step 155, the other party proxy address which is made correspond to the transmission destination address fetched from the IP header part of the SNMP message is retrieved in the other party proxy definition, and the other party proxy address of interest is decided as the transmission destination of the protocol proxy data.

In a manner as described above, the proxy data assembly/disassembly unit assembles the management protocol proxy data.

Figure 18:
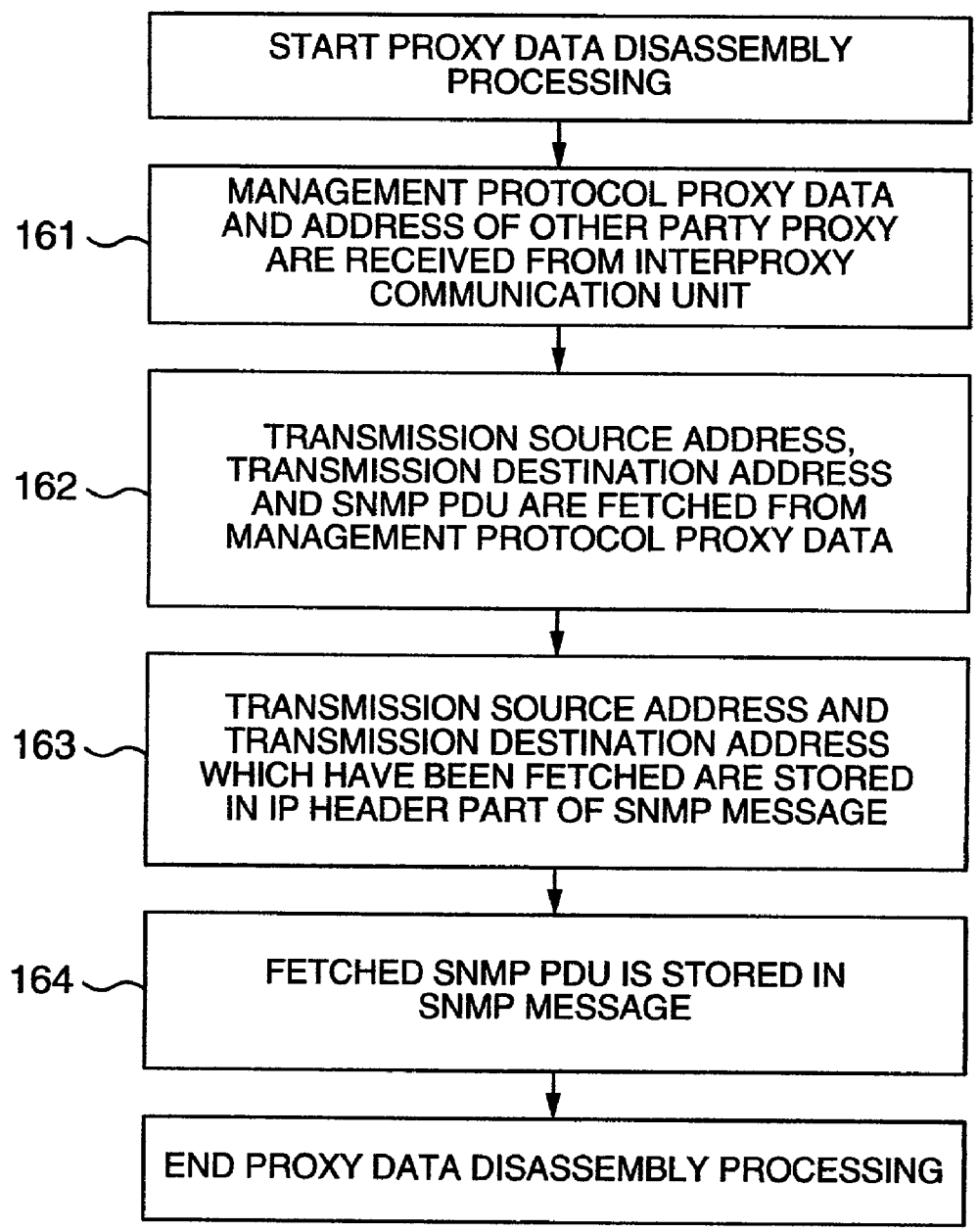
FIG. 18 is a flow chart useful in explaining the processing of disassembling proxy data.

FIG. 18 shows a flow chart useful in explaining the proxy data disassembly processing.

In Step 161, the management protocol proxy data, and the address of the management protocol proxy as the other party which has transmitted the management protocol proxy data of interest are received from the interproxy communication part. In Step 162, the transmission source address, the transmission destination address and the SNMP PDU are fetched from the management protocol proxy data. In Step 163, the transmission source address and the transmission destination address which have been fetched from the management protocol proxy data are stored in the IP header part of the SNMP message. In Step 164, the SNMP PDU which has been fetched is stored in the SNMP message.

In a manner as described above, the proxy data assembly/disassembly unit disassembles the management protocol proxy data.

Figure 19:
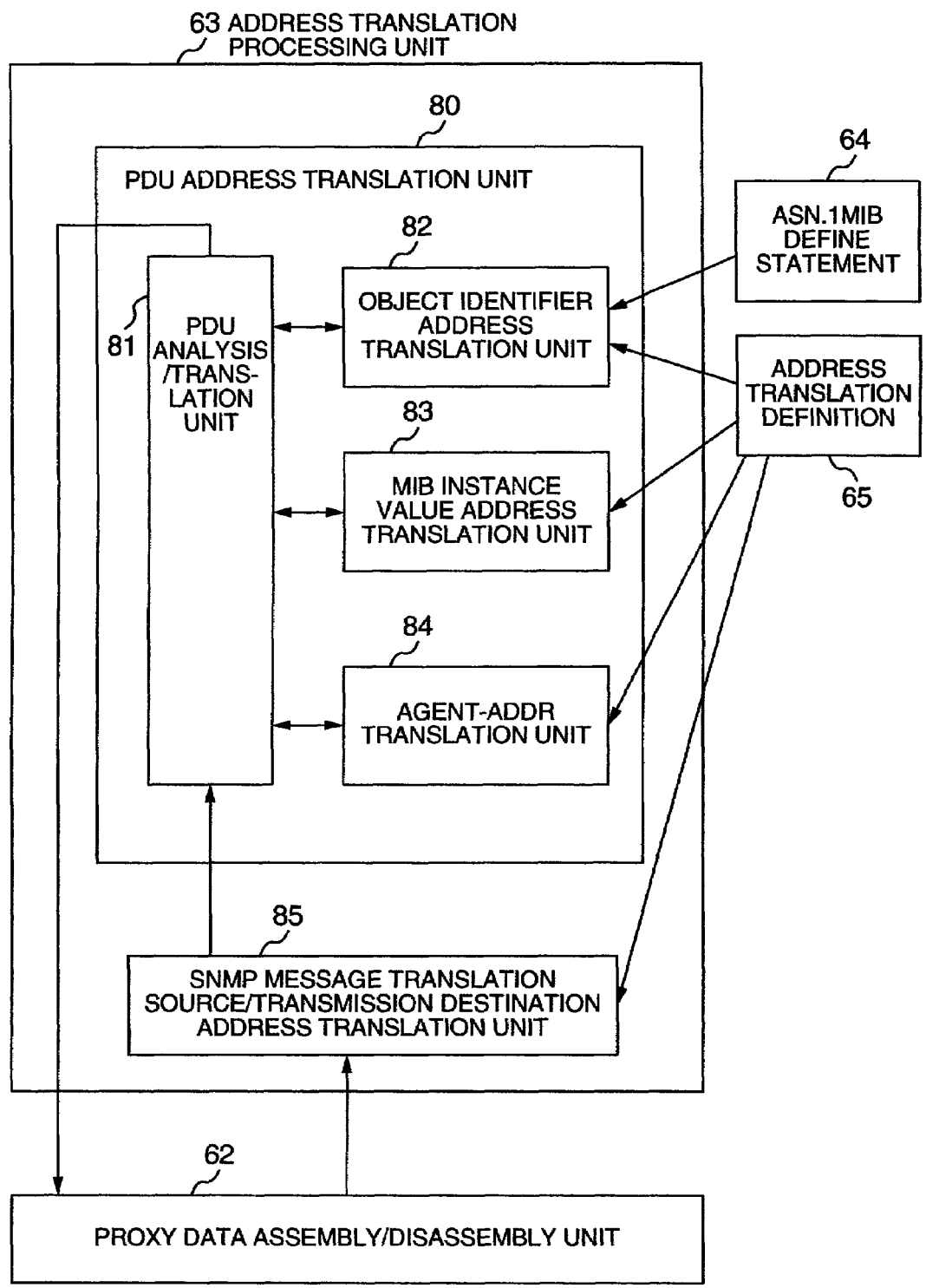
FIG. 19 is a block diagram showing a configuration of an address translation processing unit.

FIG. 19 is a block diagram showing a configuration of the address translation processing unit 63.

The address translation processing unit 63 includes: an SNMP message transmission source/ transmission destination address translation unit 85 for translating the address of the transmission source and the address of the transmission destination of the SNMP message; and a PDU address translation unit 80 for translating the address information contained in the SNMP PDU. In addition, the PDU address translation unit 80 includes: a PDU analysis/translation unit 81 for processing the analysis of the PDU and the address translation; an object identifier address translation unit 82 for processing the translation of the address which is contained as the object identifier of the address information contained in the PDU; an MIB instance value address translation unit 83 for processing the translation of the address which is contained as the MIB instance value of the address information contained in the PDU; and an agent-addr translation unit 84 for processing the translation of the address which is contained as the source address of trap (agent-addr) address of the address information contained in the PDU.

At the time when the management protocol proxy data has been delivered from the proxy data assembly/disassembly unit 62 to the address translation processing unit 63, first of all, the SNMP message transmission source/transmission destination address translation unit 85 carries out the address translation with respect to the transmission source and transmission destination of the SNMP message in the management protocol proxy data in accordance with the address translation definition 65. Next, the SNMP message transmission source/transmission destination address translation unit 85 delivers the management protocol proxy data to the PDU analysis/translation unit 81. Then, the PDU analysis/translation unit 81 carries out the analysis with respect to the PDU in the delivered management protocol proxy data to extract the part, for which the address translation is required, from the PDU. First of all, the trap transmission source address part is extracted from the PDU to be delivered to the trap transmission source address translation unit 84 which subjects in turn the trap transmission source address to the address translation in accordance with the address translation definition 65 to return the resultant address information back to the PDU analysis/translation unit 81. Then, the PDU analysis/ translation unit 81 replaces the trap transmission source address part of the PDU with the address, after completion of the address translation, which has been received from the trap transmission source address translation unit 84. In addition, the MIB instance value in which the kind of data represents the IP address is extracted from the PDU to be delivered to the MIB instance value address translation unit 83. Then, the MIB instance value address translation unit 83 subjects the MIB instance value to the address translation in accordance with the address translation definition 65 to return the resultant address information of the MIB instance value back to the PDU analysis/translation unit 81. Then, the PDU analysis/ translation unit 81 replaces the MIB instance value part of the PDU with the address, after completion of the address translation, which has been received from the MIB instance value address translation unit 83. In addition, the object identifier of the MIB is extracted from the PDU to be delivered to the object identifier address translation unit 82. Then, the object identifier address translation unit 82 subjects the IP address contained in the object identifier to the address translation in accordance with the ASN.1MIB define statement and the address translation definition 65 to return the resultant address information of the object identifier back to the PDU analysis/translation unit 81. Then, the PDU analysis/translation unit 81 replaces the object identifier part of the MIB of the PDU with the address, after completion of the address translation, which has been received from the object identifier address translation unit 82. Finally. the PDU analysis/translation unit returns the management protocol proxy data containing therein the PDU after completion of the address translation back to the proxy data assembly/disassembly unit 62.

In a manner as described above, the address translation processing unit can carry out the address translation with respect to the data of the management protocol.

Figure 20:
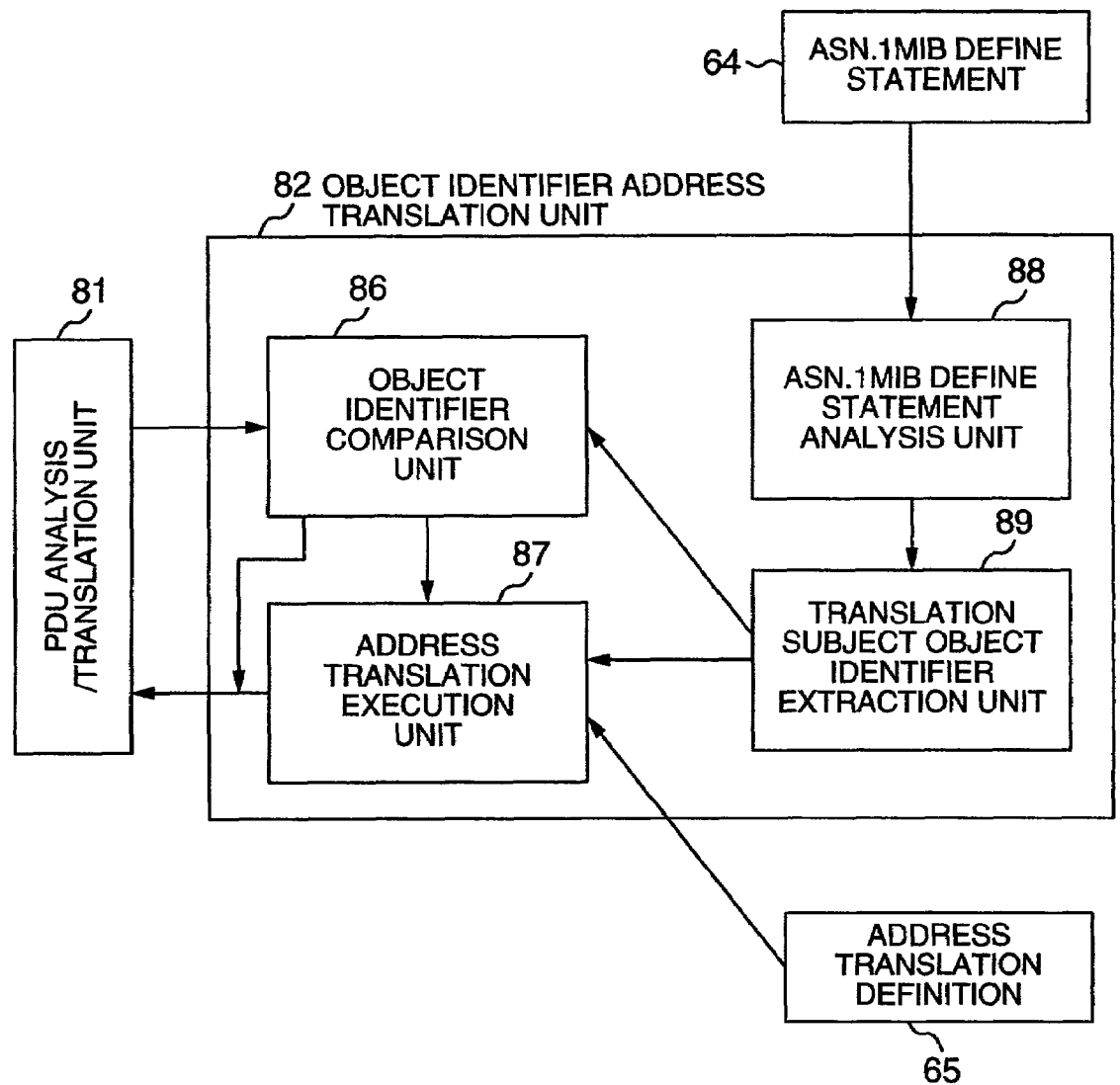
FIG. 20 is a block diagram showing a configuration of an object identifier address translation unit.

FIG. 20 is a block diagram showing a configuration of the object identifier address translation unit 82.

The object identifier address translation unit 82 includes: an ASN.1MIB define statement decoding unit 88 for decoding the ASN.1MIB define statement 65; a translation subject object identifier extraction unit 89 for extracting the object in which the object identifier needs to be translated on the basis of the definition contents of the decoded MIB; an object identifier comparison unit 86 for comparing the object identifier delivered from the PDU analysis/translation unit 81 with the object identifier extracted by the translation subject object identifier extraction unit 89 to judge whether or not the delivered object identifier needs to be translated; and an address translation extraction unit 87 for on the basis of the definition information extracted by the translation subject object identifier extraction unit 89 and the address translation definition 65, subjecting the object identifier to the address translation.

First of all, the ASN.1MIB define statement decoding unit 88 reads out the ASN.1MIB define statement 65 to decode the ASN.1MIB define statement 65 thus read out to deliver the information of the MIB definition obtained by the decoding to the translation subject object identifier extraction unit 89. Then, the translation subject object identifier extraction unit 89 extracts the MIB object having the possibility of containing the IP address in the object identifier from the delivered MIB statement to deliver the list of the object identifiers of the corresponding MIB object and the INDEX information as the definition information of the corresponding MIB object to the object identifier comparison unit 86 and the address translation extraction unit 87, respectively. Now, by the MIB object having the possibility of containing the IP address in the object identifier is meant the MIB object representing the MIB table, i.e., the MIB object in which one or more MIB objects within the MIB table used as INDEX of the table are the IP addresses. Such an object is such that while when acquiring the instance as the value of the MIB object on the basis of the GET request or the like, INDEX as the instance identifier is added on the heals of the object identifier of the MIB object to be specified as the object identifier, since the IP address is used in INDEX at this time, there is a possibility that the IP address is contained in the object identifier. In addition, as for the INDEX information which is to be delivered to the address translation execution unit 87, in order that when a plurality of MIB objects are made correspond to one another as INDEXs of the MIB table, a part of the IP address of them may be translated, the information is delivered in which SYNTAXs as the kinds of MIB objects used as INDEXs are arranged in order. For example, in the case of the MIB table in which one MIB object of an integral number and the IP address are taken as INDEX, the instance identifier becomes the identifier having one sub-identifier for an integral number and four sub-identifiers for the IP address, i.e., five sub-identifiers in total. In the address translation, since the second to fifth sub-identifiers of them need to be interpreted as the IP address to be translated, for INDEX, it is necessary to deliver the information having a set of one integral number and one IP address to the address translation execution unit 87.

Now, at the time when the object identifier in the PDU has been delivered from the PDU analysis/translation unit 81 to the object identifier address translation unit 82, first of all, the object identifier comparison unit 86 receives the object identifier. Then, the object identifier comparison unit 86 compares the object identifier delivered from the PDU analysis/translation unit 81 with the object identifier list of the translation subject extracted by the translation subject object identifier extraction unit 89. If the object identifier delivered from the PDU analysis/translation unit 81 is contained in the object identifier list of the translation subject, then the object identifier is delivered from the PDU analysis/translation unit 81 to the address translation execution unit 87. On the other hand, if the object identifier delivered from the PDU analysis/translation unit 81 is not contained in the object identifier list of the translation subject, then the object identifier delivered from the PDU analysis/translation unit 81 is not translated at all to be returned back to the PDU analysis/translation unit 81 as it is.

Next, with respect to the object identifier delivered therefrom, first of all, the address translation execution unit 87 specifies the location of the IP address appearing in the object identifier, i.e., the translation location on the basis of the INDEX information delivered from the translation subject object extraction unit 89 and next, carries out the address translation on the basis of the address translation definition 65 to return the object identifier after completion of the address translation back to the PDU analysis/translation unit 81.

In a manner as described above, the object identifier address translation unit can subject the IP address contained in the object identifier of the MIB to the address translation.

Figure 21:
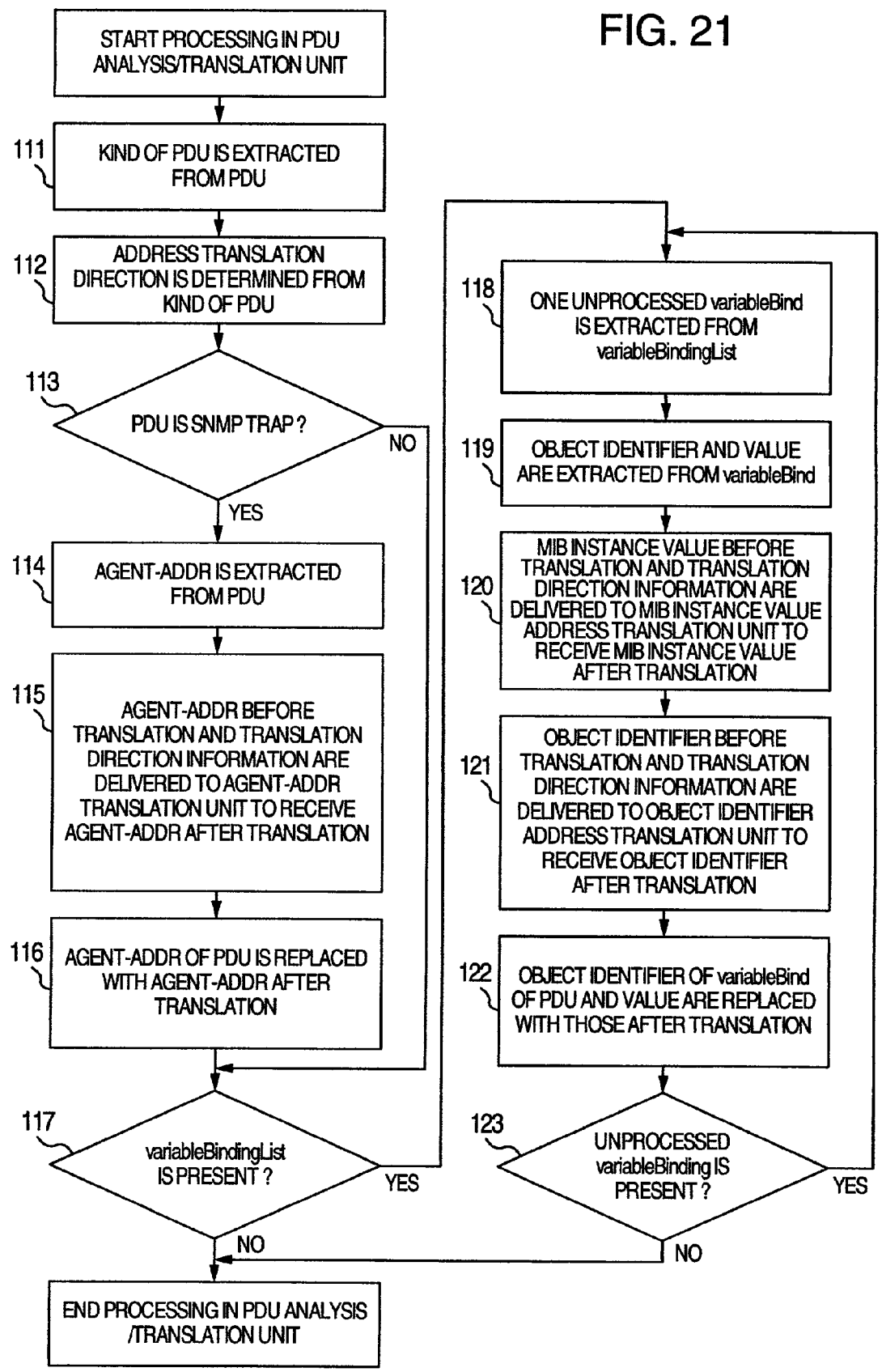
FIG. 21 is a flow chart useful in explaining the processing executed in a PDU analysis/translation unit.

The processing in the PDU analysis/translation unit will hereinbelow be described with reference to a flow chart shown in FIG. 21.

In Step 111, the data representing the kind of PDU is extracted from the PDU. In Step 112, the address translation direction is determined from the kind of PDU. By the address translation direction is meant whether the address in the PDU is translated from the management address into the real address or from the real address into the management address. For the PDU which is transmitted from the managing side to the managed side, the management address is translated into the real address. For the PDU transmitted from the managed side to the managing side, the real address is translated into the management address. Whether the PDU is transmitted from the managing side to the managed side or from the managed side to the managing side is determined every kind of PDU, and hence the address translation direction can be determined from the kind of PDU in accordance with a table shown in FIG. 22. In Step 113, it is judged whether or not the kind of PDU is the SNMP trap. If it is judged in Step 113 that the kind of PDU is the SNMP trap, then the processing proceeds to Step 114. On the other hand, if it is judged in Step 113 that the kind of PDU is not the SNMP trap, then the processing proceeds to Step 117. In Step 114, the trap transmission source address is extracted from the PDU. In Step 115, the trap transmission source address extracted in Step 114 and the information of the address translation direction determined in Step 112 are delivered to the trap transmission source address translation unit and then the trap transmission source address after completion of the translation is received. In Step 116, the trap transmission source address of the PDU is replaced with the trap transmission source address, after completion of the translation, which has been received in Step 115. In Step 117, it is judged whether or not variableBindingList is present in the PDU. If it is judged in Step 117 that variableBindingList is present in the PDU, then the processing proceeds to Step 118. On the other hand, if it is judged in Step 117 that variableBindingList is absent in the PDU, then the processing in the PDU analysis/translation unit is completed. In Step 118, one unprocessed variableBind is executed from variableBindingList. In Step 119, the object identifier and the value are extracted from variableBind extracted in Step 118. In Step 120, both of the MIB instance value extracted in Step 119 and the information of the translation direction determined in Step 112 are delivered to the MIB instance value address translation unit and then the MIB instance value after completion of the translation is received. In Step 121, both of the object identifier extracted in Step 119 and the information of the translation direction determined in Step 112 are delivered to the object identifier address translation unit and then the object identifier after completion of the translation is received. In Step 122, the object identifier of variableBind of the PDU is replaced with the object identifier, after completion of the translation, which has been received in Step 121, and also the MIB instance value of variableBind is replaced with the MIB instance value, after completion of the translation, which has been received in Step 120. In Step 123, it is judged whether or not the unprocessed variableBinding still remains. If it is judged in Step 123 that the unprocessed variableBinding still remains, then the processing proceeds to Step 118. On the other hand, if it is judged that the unprocessed variableBinding does not yet remain, then the processing in the PDU analysis/translation unit is completed.

Figure 23:
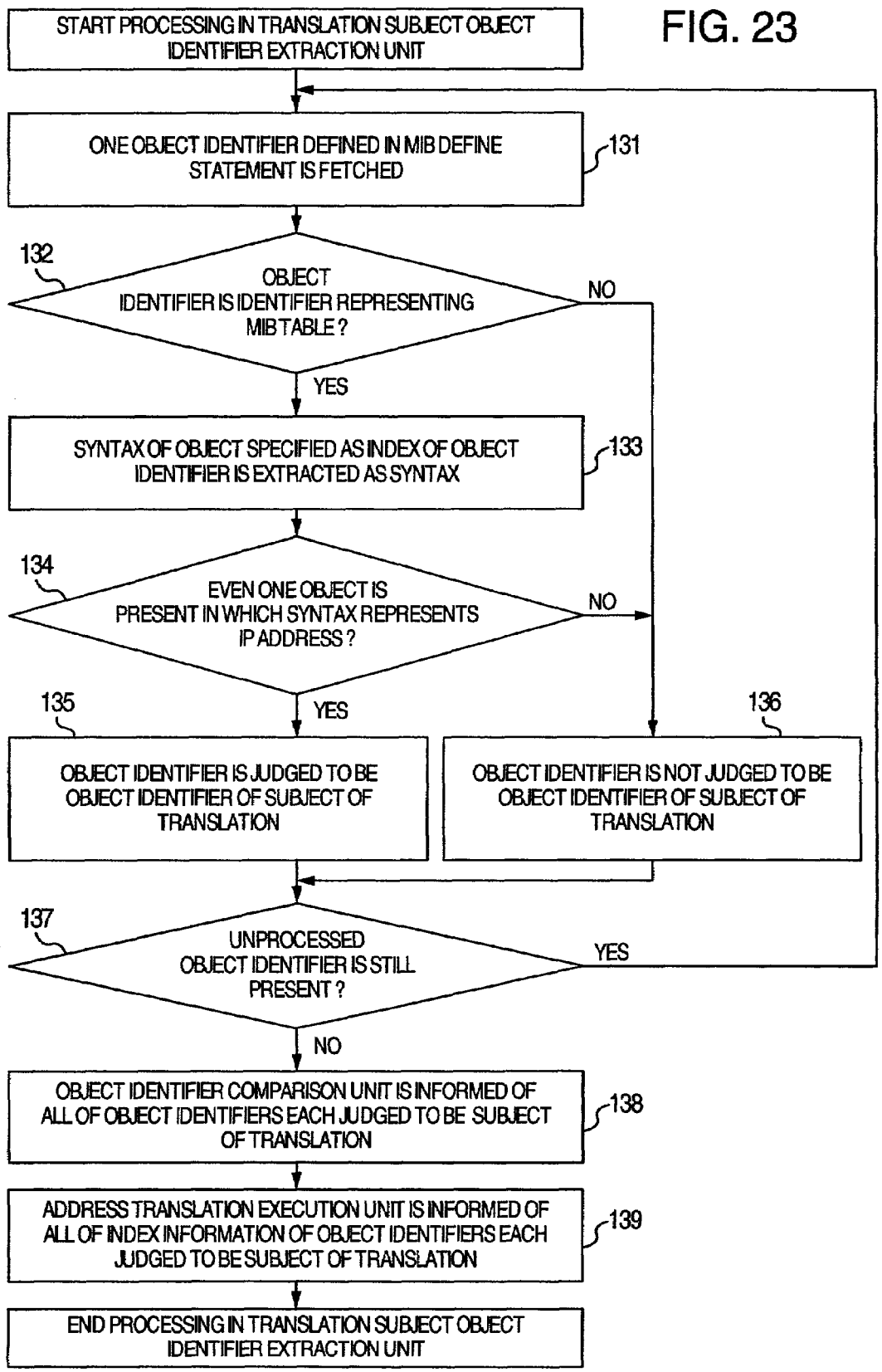
FIG. 23 is a flow chart useful in explaining the processing in a translation subject object identifier extraction unit.

In a manner as described above, the address information in the PDU can be translated. Next, the processing in the translation subject object identifier extraction unit will hereinbelow be described with reference to a flow chart shown in FIG. 23.

In Step 131, one object identifier which is defined in the MIB statement is fetched. In Step 132, it is judged whether or not the object identifier fetched in Step 131 is the identifier representing the MIB table. If it is judged in Step 132 that the object identifier fetched in Step 131 is the identifier representing the MIB table, then the processing proceeds to Step 133. On the other hand, if it is judged in Step 132 that the object identifier fetched in Step 131 is not the identifier representing the MIB table, then the processing proceeds to Step 136. In Step 133, SYNTAX of the MIB object in the table which is specified as INDEX of the object identifier is extracted. In Step 134, it is judged whether or not there is even one object in which SYNTAX of the MIB object in the table extracted in Step 133 is SYNTAX representing the IP address. If it is judged in Step 134 that there is even one object in which SYNTAX is SYNTAX representing the IP address, then the processing proceeds to Step 135. On the other hand, if it is judged in Step 134 that there is not even one object in which SYNTAX is SYNTAX representing the IP address, then the processing proceeds to Step 136. In Step 135, it is judged that the object identifier fetched in Step 131 is the object identifier of a subject of the translation.

On the other hand, in Step 136, it is judged that the object identifier fetched in Step 131 is not the object identifier of a subject of the translation. In Step 137, it is judged whether or not any of the unprocessed object identifiers still remains in the MIB define statement. If it is judged in Step 137 that any of the unprocessed object identifiers still remains in the MIB define statement, then the processing proceeds to Step 131. On the other hand, if it is judged in Step 137 that any of the unprocessed object identifiers does not yet remains in the MIB define statement, then the processing proceeds to Step 138. In Step 138, the object identifier comparison unit is informed of all of the object identifiers each of which has been judged to be a subject of the translation. In Step 139, the address translation execution unit is informed of all of the INDEX information of the object identifiers each of which has been judged to be a subject of the translation.

In a manner as described above, it is possible to realize the processing in the translation subject object identifier extraction unit.

Figures 24, 25:
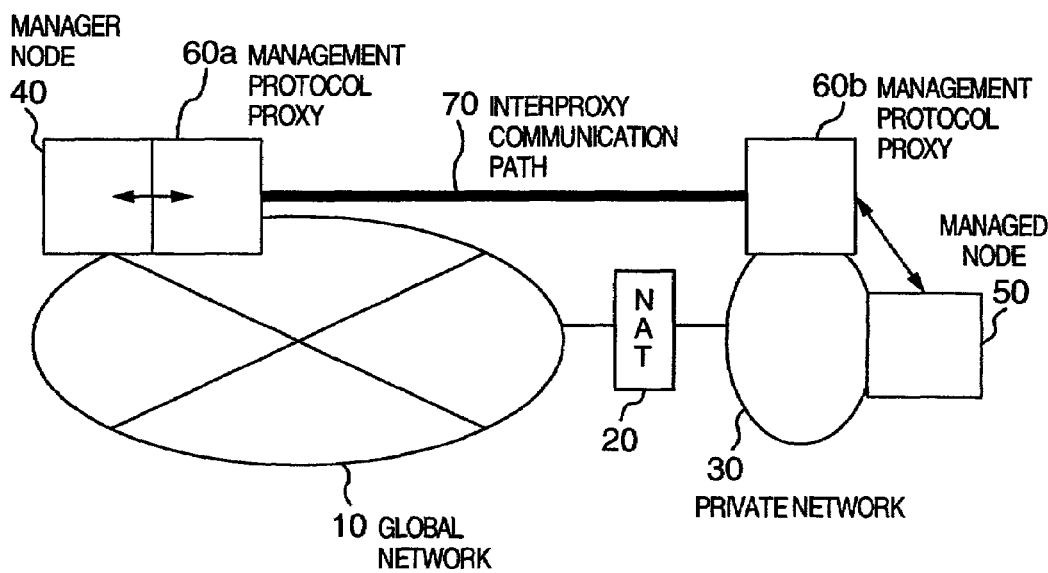
FIG. 24 is a diagram showing a definition example of the address translation definition.
FIG. 25 is a diagram showing an example of a configuration of a virtual network management system.

FIG. 24 shows a definition example of the address translation definition 65.

A definition line 301 is a definition example in the case where only a first octet of the IP address is translated. In this case, with respect to all of the real addresses in each of which the first octet is 10, the real address in which the first octet is translated into 100 becomes the management address. For example, in the case where the address 100.1.2.3 is present in the data of the management protocol which has been transmitted from the manager 40, the address of interest is translated into an address 10.1.2.3 through the address translation to be relayed to the managed node 50. On the contrary, in the case where the address 10.1.2.3 is present in the response from the managed node 50, the address of interest is translated into an address 100.1.2.3 through the address translation to be relayed to the manager 40. A definition line 302 is a definition example in the case where a first octet and a second octet of the IP address are both translated. In this case, with respect to all of the real addresses in each of which the first octet is 172 and the second octet is 16, the real address in which the first octet is translated into 101 and the second octet is translated into 10 becomes the management address. For example, in the case where the address 101.10.1.2 is present in the data of the management protocol which has been transmitted from the manager 40, the address of interest is translated into an address 172.16.1.2 through the address translation to be relayed to the managed node 50. On the contrary, in the case where the address 172.16.1.2 is present in the response from the managed node 50, the address of interest is translated into an address 101.10.1.2 through the address translation to be relayed to the manager 40. A definition line 303 is a definition example in the case where a first octet, a second octet and a third octet of the IP address are all translated. In this case, with respect to all of the real addresses in each of which the first octet is 172, the second octet is 17 and the third octet is 50, the real address in which the first octet is translated into 110, the second octet is translated into 20 and the third octet is translated into 80 becomes the management address. For example, in the case where the address 110.20.80.1 is present in the data of the management protocol which has been transmitted from the manager 40, the address of interest is translated into an address 172.17.50.1 through the address translation to be relayed to the managed node 50. On the contrary, in the case where the address 172.17.50.1 is present in the response from the managed node 50, the address of interest is translated into an address 110.20.80.1 through the address translation to be relayed to the manager 40. In addition, a definition line 304 is a definition example in the case where when all of the octets from the first octet to the fourth octet are translated. In this case, the real address in which the address is 192.168.20.5 is translated into the address 120.60.11.8 for management. For example, in the case where the address 120.60.11.8 is present in the data of the management protocol which has been transmitted from the manager 40, the address of interest is translated into an address 192.168.20.5 through the address translation to be relayed to the managed node 50. On the contrary, in the case where the address 192.168.20.5 is present in the response from the managed node 50, the address of interest is translated into an address 120.60.11.8 through the address translation to be relayed to the manager 40.

FIG. 25 is a diagram showing an example of a configuration of another virtual network management system.

In this case, while the manager 40 and the management protocol proxy 60a on the manager side are present on the global network 10, it is possible to carry out the virtual network management using the management address without being different from the case having the configuration shown in FIG. 1.

Figure 26:
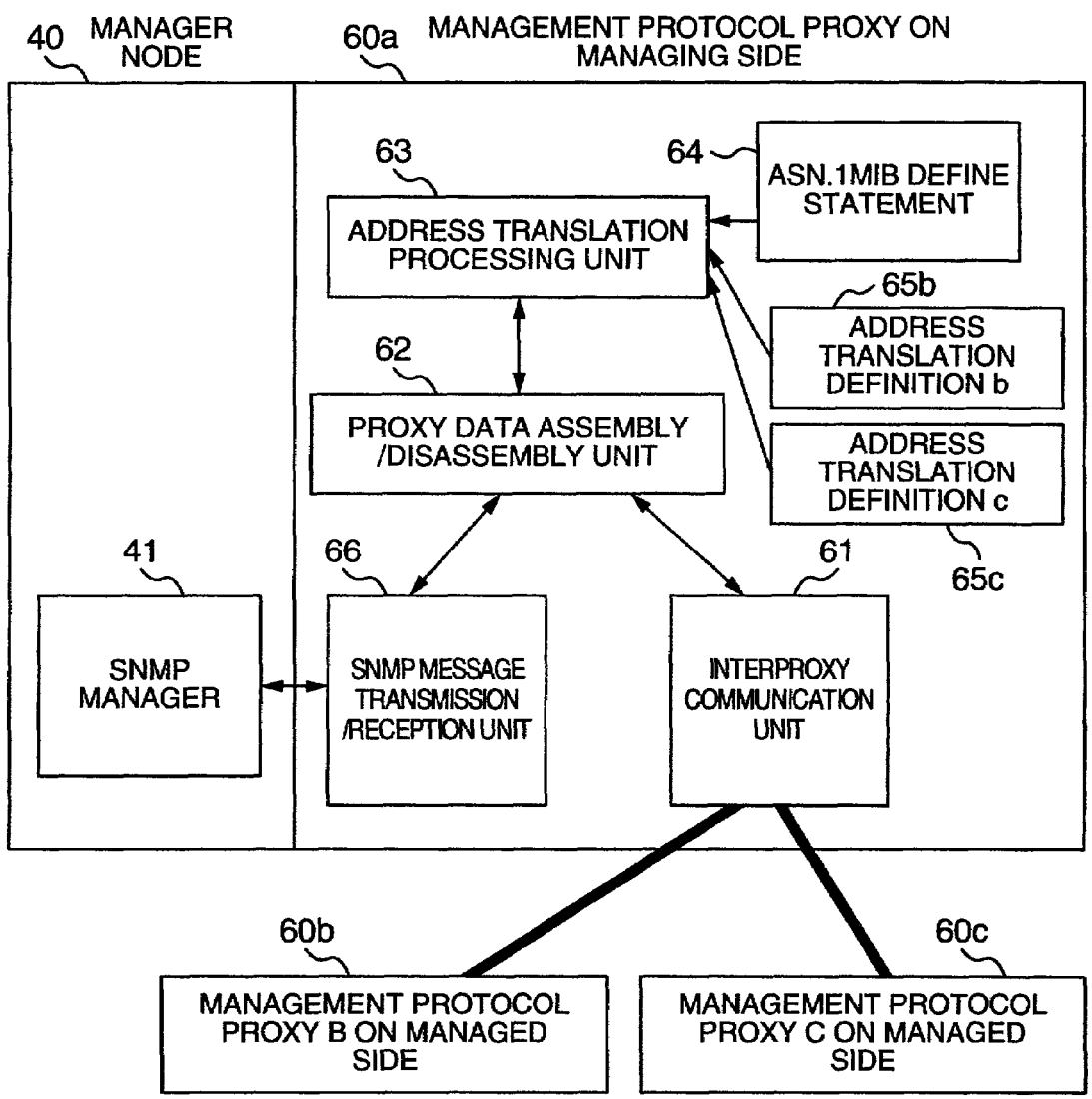
FIG. 26 is a block diagram showing a configuration of a management protocol proxy.
Figure 27:
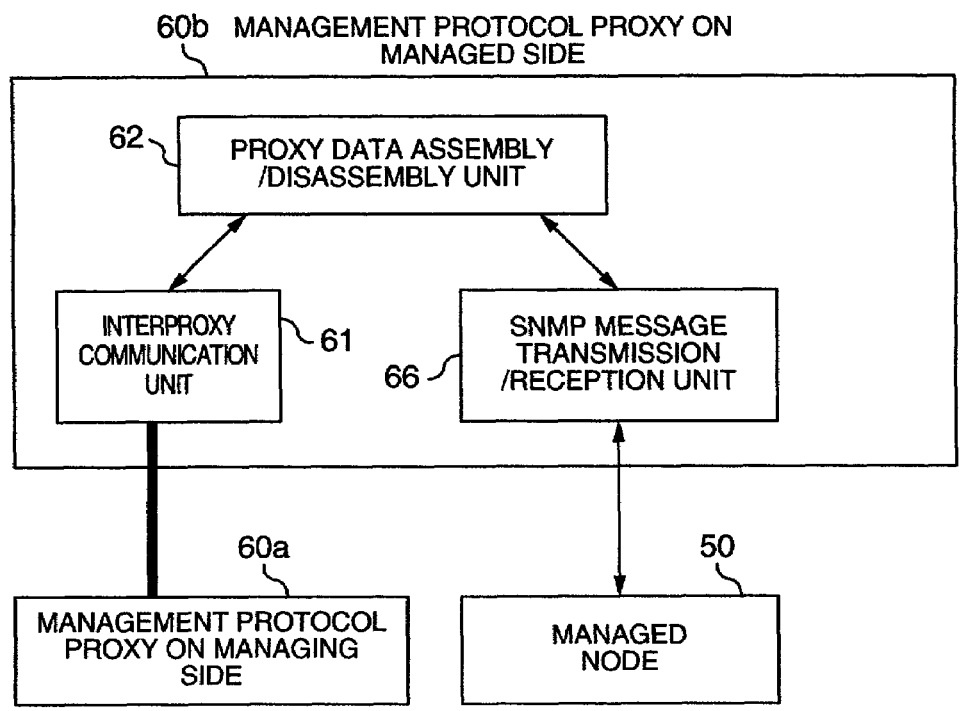
FIG. 27 is a block diagram showing a configuration of a management protocol proxy.

FIG. 26 and FIG. 27 are respectively block diagrams showing configurations of the management protocol proxies in still another embodiment and yet another embodiment, i.e., embodiments in the case where the address translation is carried out by the management protocol proxy on the managing side.

In these cases as well, the address translation can be carried out in the same manner as that in the case where the address translation is carried out by the management protocol proxy on the managed side shown in FIG. 12 and FIG. 13. But, when the address translation is carried out in the management protocol proxy on the managing side, the address translation definition which is to be carried out in the management protocol proxy on the managing side is defined individually every private network on the managed side. For example, the address translation definition 65*b* and the address translation definition 65*c* are respectively defined for the private network B on the managed side and for the private network C on the managed side. As a result, even in the case where the private addresses of the managers conflict with each other in a plurality of private networks on the managed side as in the configuration shown in FIG. 9, the address translation can be made carried out properly.

Figure 28:
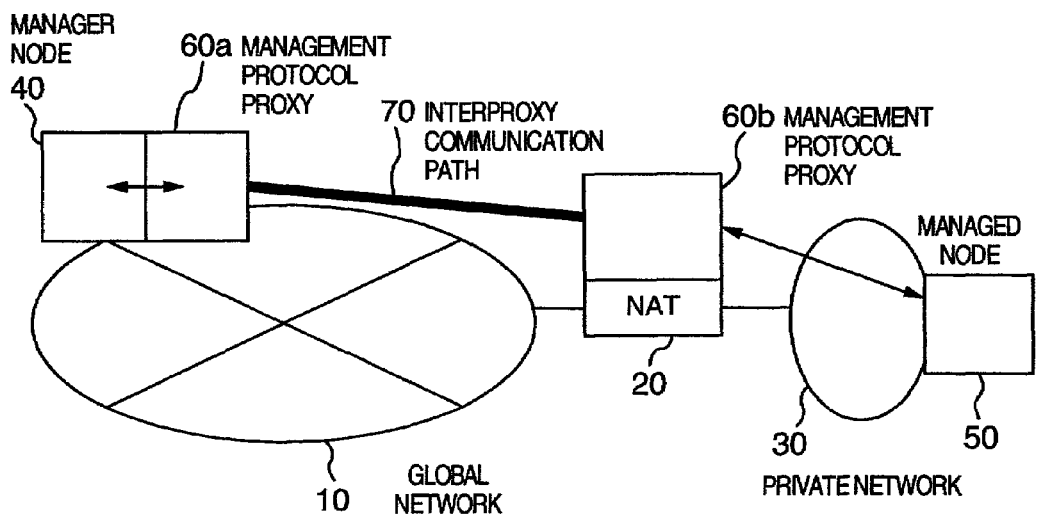
FIG. 28 is a diagram showing an example of a configuration of a virtual network management system.
Figure 29:
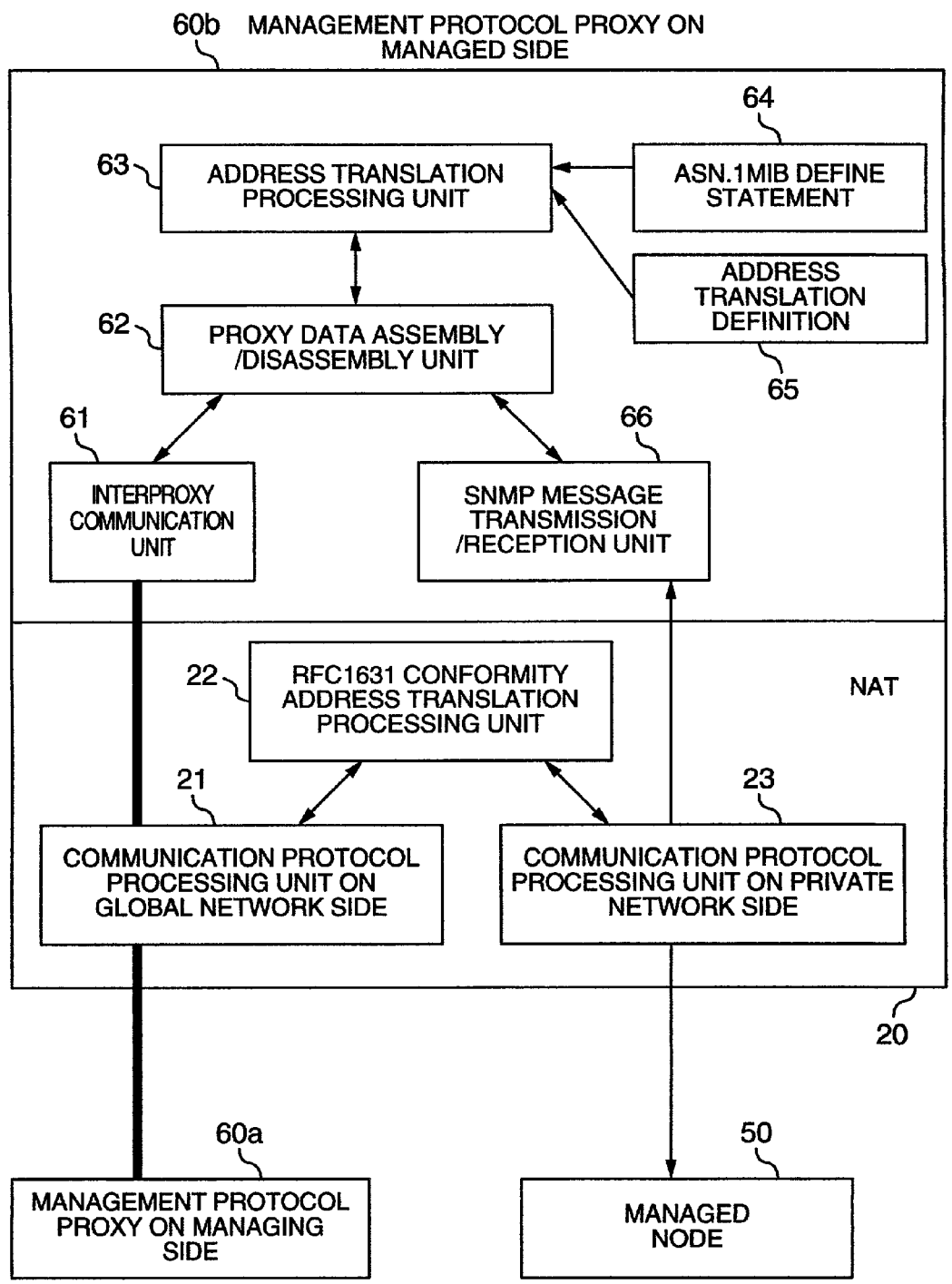
FIG. 29 is a block diagram showing a configuration of a management protocol proxy on the managed side.

FIG. 28 is a block diagram showing a configuration of the virtual network management system in a further embodiment, and FIG. 29 is a block diagram showing a configuration of the management protocol proxy on the managed side in the further embodiment. In these figures, each of the configurations is such that the management protocol proxy on the managed side is operated on the same apparatus as the NAT conforming to RFC1631.

The configuration of this example is such that the manager 40 and the management protocol proxy 60*a* on the managing side are present on the global network 10, and the management address translation is carried out in the management protocol proxy on the managed side, and the management protocol proxy on the managed side is operated on the same apparatus as that of the NAT 20 conforming to RFC 1631.

FIG. 29 shows the configuration of the management protocol proxy 60*b* on the managed side which is operated on the same apparatus as that of the NAT 20 not having the address translation function of the management protocol conforming to RFC1631. A point of difference from the configuration shown in FIG. 12 is that when the interproxy communication unit 61 is intended to communicate with the management protocol proxy 60*a* on the managing side, the communication is carried out through a global network side communication protocol processing unit 21, and when the SNMP message transmission/reception unit 66 transmits/receives the data to/from the managed node 50, the communication is carried out through a private network side communication protocol processing unit 23 of the NAT 20. By the way, as for the motion conforming to RFC1631 of the NAT 20, with respect to the packet which is intended to pass through the associated apparatuses of the NAT 20 from the global network side to the private network side, first of all, the global network side communication protocol processing unit 21 catches the packet which is intended to pass therethrough to deliver the packet thus caught to an RFC1631 conformity address translation processing unit 22, and then the RFC1631 conformity address translation processing unit 22 carries out the address translation. Thereafter, the packet of interest is delivered to the private network side communication protocol processing unit 23 to be sent to the private network side by the private network side communication protocol processing unit 23.

On the contrary, with respect to the packet which is intended to pass through the associated apparatuses of the NAT 20 from the private network side to the global network side, first of all, the private network side communication protocol processing unit 23 catches the packet which is intended to pass therethrough to deliver the packet thus caught to the RFC1631 conformity address translation processing unit 22 and then the RFC1631 conformity address translation processing unit 22 carries out the address translation. Thereafter, the packet is delivered to the global network side communication protocol processing unit 21 to be sent to the global network side by the the global network side communication protocol processing unit 21.

However, the communication made by the interproxy communication unit 61 is the communication in which the address on the global network side of the apparatus in which the NAT and the management protocol proxy on the managed side are both operated is made either the transmission destination or the transmission source, but is not the communication in which the associated information is not intended to pass through the NAT 20. For this reason, the data is delivered from the global network side communication processing unit 21 to the interproxy communication unit 61 as it is without passing through the RFC1631 conformity address translation processing unit 22.

In addition, with respect to the communication as well made by the SNMP message transmission/reception unit 66, it is the communication in which the address on the private network side of the apparatus in which the NAT and the management protocol proxy on the managed side are both operated is made either the transmission destination or the transmission source, but is not the communication in which the associated information is not intended to pass through the NAT 20. For this reason, the data is delivered from the private network side communication processing unit 23 to the SNMP message transmission/reception unit 66 as it is without passing through the RFC1631 conformity address translation processing unit 22.

From the foregoing, it is possible that the management protocol proxy having the same configuration as that of the management protocol proxy on the managed side shown in FIG. 12 is employed to be operated on the same apparatus as the NAT 20 to realize the virtual network management.

By the way, as has already been described, the processing in the management protocol proxy, as shown in the flow chart, can be realized in the form of the program.

Above, while the NAT has been described as the apparatus for carrying out the address translation of the IP layer (the NAT does not have the function of translating the address of the PDU part of the management protocol), in the case where the NAT has the function of carrying out the address translation of the IP layer and the function of translating the address of the PDU part of the management protocol, the NAT and the management protocol proxy server can be selectively utilized to carry out the address translation of the PDU part of the management protocol.

As set forth hereinabove, according to the present invention, the data communication can be carried out between the proxies of the management protocol, and also the data communication by the management protocol can be carried out between the nodes each not having the global address.

Although the present invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other configurations for carrying out the same purpose of the present invention. It should also be realized by those skilled in the art that such equivalent configurations do not depart from the spirit and scope of the invention as set forth in the appended claims.

It is therefore contemplated that the claims will cover any such modifications or embodiments that fall within the true scope of the invention.

What is claimed is:

1. A management protocol proxy between a private network and a global network, the private and global networks being connected via an Internet Protocol (IP) Network Address Translator (NAT) for translating between a private address system of the private network and a global address system of the global network, the management protocol proxy comprising:
   an address translation processing unit that receives a packet containing management protocol data transmitted from a monitored apparatus on the private network, and translates a transmission source address contained in the received packet into a virtual address belonging to a management address system different from the private and global address systems to form management protocol proxy data comprising the virtual address and the management protocol data;
   an assembly/disassembly processing unit that generates a management protocol proxy data packet including the management protocol proxy data, an address of the management protocol proxy as a transmission source address of the management protocol proxy data packet, and an address of another management protocol proxy as a transmission destination address of the management protocol proxy data packet; and
   an interproxy communication unit that transmits the management protocol proxy data packet to said another management protocol proxy designated by the transmission destination address, via the global network.

2. The management protocol proxy according to claim 1, further comprising:
   an address translation definition defining correspondence relationships between addresses belonging to the management address system and real addresses,
   wherein the address translation processing unit translates the transmission source address contained in the received packet into the virtual address, based on the address translation definition.

3. The management protocol proxy according to claim 2, wherein the address translation processing unit further translates address information in data contained in the received packet containing management protocol data.

4. The management protocol proxy according to claim 3, wherein:
   the received packet containing management protocol data comprises a Simple Network Management Protocol (SNMP) message, and
   the management protocol data comprises a Protocol Data Unit (PDU).

5. The management protocol proxy according to claim 4, wherein the address translation processing unit translates address information contained in the PDU of the SNMP message using the address translation definition and an Abstract Syntax Notation One (ASN.1) define statement of a MIB object to be translated.

6. The management protocol proxy according to claim 1, wherein:
   said another management protocol proxy comprises an address translation definition in defining correspondence relationships between real addresses and addresses belonging to the management address system, and
   an address translation processing unit of said another management protocol proxy translates the virtual address, based on the address translation definition of said another management protocol proxy.

7. The management protocol proxy according to claim 6, wherein:
   the received packet containing management protocol data comprises a Simple Network Management Protocol (SNMP) message, and
   the management protocol data comprises a Protocol Data Unit (PDU).

8. The management protocol proxy according to claim 7, wherein the address translation processing unit of said another management proxy translates address information contained in the PDU of the SNMP message using the address translation definition and an Abstract Syntax Notation One (ASN.1) define statement of a MIB object to be translated.

9. The management protocol proxy according to claim 1, wherein the management protocol proxy comprises a proxy server.

10. A method of performing network management between a private network and a global network, the private and global networks being connected via an Internet Protocol (IP) Network Address Translator (NAT) for translating between a private address system of the private network and a global address system of the global network, the method comprising:
    translating a transmission source address of a packet containing management protocol data received from a monitored apparatus on the private network to a virtual address belonging to a management address system different from the private and global address systems to form management protocol proxy data comprising the virtual address and the management protocol data;
    generating a management protocol proxy data packet including the management protocol proxy data, an address of a management protocol proxy which is between the private and global networks as a transmission source address of the management protocol proxy data packet, and an address of another management protocol proxy as a transmission destination address of the management protocol proxy data packet; and
    transmitting the management protocol proxy data packet to said another management protocol proxy designated by the transmission destination address, via the global network.

11. The method according to claim 1, wherein:
    the translating comprises translating the transmission source address contained in the received packet to the virtual address, based on an address translation definition; and
    the address translation definition defines correspondence relationships between addresses belonging to the management address system and real addresses.

12. The method according to claim 11, further comprising translating address information in data contained in the received packet.

13. The method according to claim 12, wherein:
    the received packet containing management protocol data comprises a Simple Network Management Protocol (SNMP) message, and
    the management protocol data comprises a Protocol Data Unit (PDU).

14. The method according to claim 13, wherein the translating comprises translating address information contained in the PDU of the SNMP message using the address translation definition and an Abstract Syntax Notation One (ASN.1) define statement of a MIB object to be translated.

15. The method according to claim 1, further comprising:
translating the virtual address contained in the packet of management protocol proxy data at said another management protocol proxy, based on an address translation definition of said another management protocol proxy;
wherein the address translation definition of said another management protocol proxy defines correspondence relationships between real addresses and addresses belonging to the management address system.

16. The method according to claim 15, wherein:
the received packet containing management protocol data comprises a Simple Network Management Protocol (SNMP) message, and
the management protocol data comprises a Protocol Data Unit (PDU).

17. The method according to claim 16, wherein the translating of the virtual address at said another management protocol proxy comprises translating address information contained in the PDU of the SNMP message using the address translation definition and an Abstract Syntax Notation One (ASN.1) define statement of a MIB object to be translated.

18. A program product comprising a computer readable storage medium and executable programming embodied on the medium, wherein execution of the programming causes a programmable device to perform steps for operation as a management protocol proxy between a private network and a global network connected via an Internet Protocol (IP) Network Address Translator (NAT) for translating between a private address system of the private network and a global address system of the global network, the steps comprising:
translating a transmission source address of a packet containing management protocol data received from a monitored apparatus on the private network to a virtual address belonging to a management address system different from the private and global address systems to form management protocol proxy data comprising the virtual address and the management protocol data;
generating a management protocol proxy data packet including the management protocol proxy data, an address of the management protocol proxy as a transmission source address of the management protocol proxy data packet, and an address of another management protocol proxy as a transmission destination address of the management protocol proxy data packet; and
transmitting the management protocol proxy data packet to said another management protocol proxy designated by the transmission destination address, via the global network.

19. The product according to claim 18, wherein:
the translating comprises translating the transmission source address contained in the received packet to the virtual address, based on an address translation definition; and
the address translation definition defines correspondence relationships between addresses belonging to the management address system real addresses.

20. The product according to claim 19, wherein the steps performed further comprise translating address information in data contained in the received packet.

21. The product according to claim 20, wherein:
the received packet containing management protocol data comprises a Simple Network Management Protocol (SNMP) message, and
the management protocol data comprises a Protocol Data Unit (PDU).

22. The product according to claim 21, wherein the translating comprises translating address information contained in the PDU of the SNMP message using the address translation definition and an Abstract Syntax Notation One (ASN.1) define statement of a MIB object to be translated.

23. The product according to claim 18, wherein:
the steps performed further comprise translating the virtual address at said another management protocol proxy, based on an address translation definition of said another management protocol proxy; and
the address translation definition of said another management protocol proxy defines correspondence relationships between real addresses and addresses belonging to the management address system.

24. The product according to claim 23, wherein:
the received packet containing management protocol data comprises a Simple Network Management Protocol (SNMP) message, and
the management protocol data comprises a Protocol Data Unit (PDU).

25. The product according to claim 24, wherein the translating of the virtual address at said another management protocol proxy comprises translating address information contained in the PDU of the SNMP message using the address translation definition and an Abstract Syntax Notation One (ASN.1) define statement of a MIB object to be translated.

* * * * *